United States Patent [19]
Petersen

[11] Patent Number: 5,517,627
[45] Date of Patent: May 14, 1996

[54] READ AND WRITE DATA ALIGNER AND METHOD

[75] Inventor: Brian Petersen, Los Altos, Calif.

[73] Assignee: 3Com Corporation, Santa Clara, Calif.

[21] Appl. No.: 113,417

[22] Filed: Aug. 27, 1993

Related U.S. Application Data

[63] Continuation-in-part of Ser. No. 947,055, Sep. 18, 1992, Pat. No. 5,392,406.

[51] Int. Cl.$^6$ ...................................................... H01J 13/00
[52] U.S. Cl. ......................................................... 395/311
[58] Field of Search ................................. 395/425, 325, 395/275, 250, 311, 310, 411, 421.09, 436, 437

[56] References Cited

U.S. PATENT DOCUMENTS

| | | | |
|---|---|---|---|
| 4,131,940 | 12/1978 | Moyer | 395/250 |
| 4,447,878 | 5/1984 | Kinnie et al. | 395/325 |
| 4,455,606 | 6/1984 | Cushing et al. | 395/325 |
| 4,654,781 | 3/1987 | Schwartz | 364/DIG. 1 |
| 4,663,732 | 5/1987 | Robinson | 395/250 |
| 4,667,305 | 5/1987 | Dill et al. | 395/325 |
| 4,672,570 | 6/1987 | Benken | 395/200 |
| 4,959,779 | 9/1990 | Weber et al. | 395/775 |
| 4,992,931 | 2/1991 | Hirasawa | 364/DIG. 1 |
| 5,014,186 | 5/1991 | Chisholm | 395/275 |
| 5,058,051 | 10/1991 | Brooks | 395/425 |
| 5,113,369 | 5/1992 | Kinoshita | 395/325 |
| 5,125,080 | 6/1992 | Pleva et al. | 395/325 |
| 5,168,561 | 12/1992 | Vo | 395/425 |
| 5,179,671 | 1/1993 | Kelly et al. | 395/375 |
| 5,185,876 | 2/1993 | Nguyen et al. | 395/425 |
| 5,274,763 | 12/1993 | Bank | 395/250 |
| 5,297,242 | 3/1994 | Miki | 395/425 |

*Primary Examiner*—Jack B. Harvey
*Assistant Examiner*—Xuong M. Chung-Trans
*Attorney, Agent, or Firm*—Haynes & Davis

[57] ABSTRACT

A data aligner transfers data from an input having N+1 byte lanes to an output having N+1 byte lanes. The data aligner includes a write data aligner and a read data aligner. The write data aligner includes a write shifter coupled to the N input byte lanes and a stage having N selector/registers S1(i). The N selector/registers each have a queuing register R(i) and bypass multiplexer M(i). The N selector/registers are coupled to the N output byte lanes. The write shifter and N selector/registers S1(i) are coupled to a control circuit. The read data aligner includes a stage having N selector/registers S2(i) and a read shifter. The S2(i) selector/registers are coupled to N+1 byte input lanes with the S2(i) outputs coupled to the N read shifter inputs. The read shifter outputs are then coupled to the N+1 output byte lanes. Finally, a control circuit is coupled to the selector/registers S2(i) and read shifter.

51 Claims, 12 Drawing Sheets

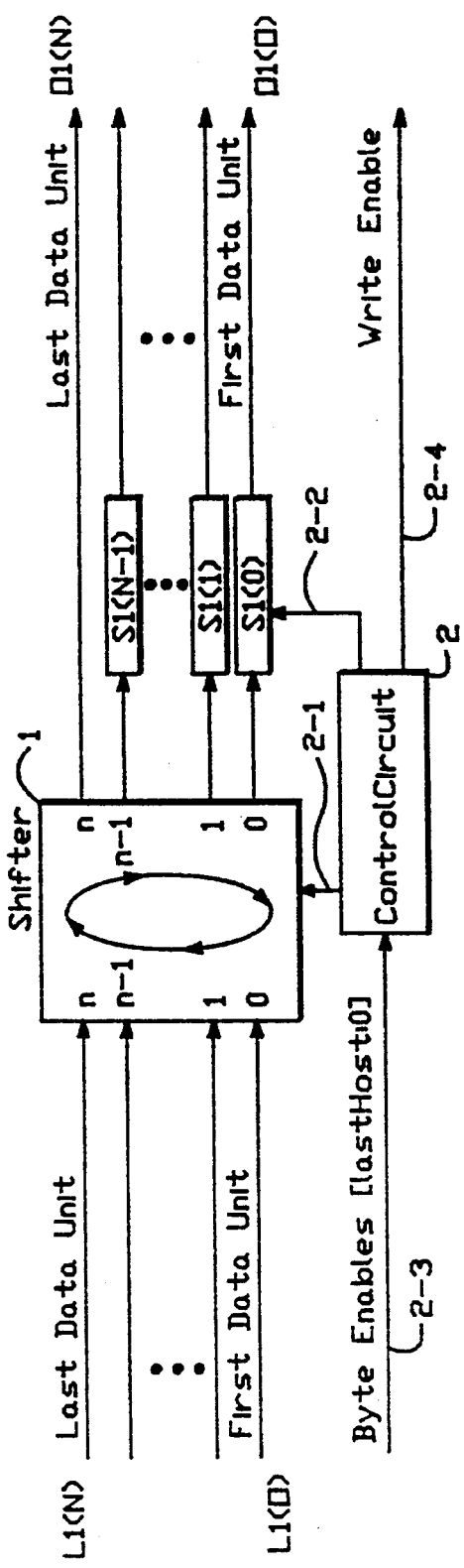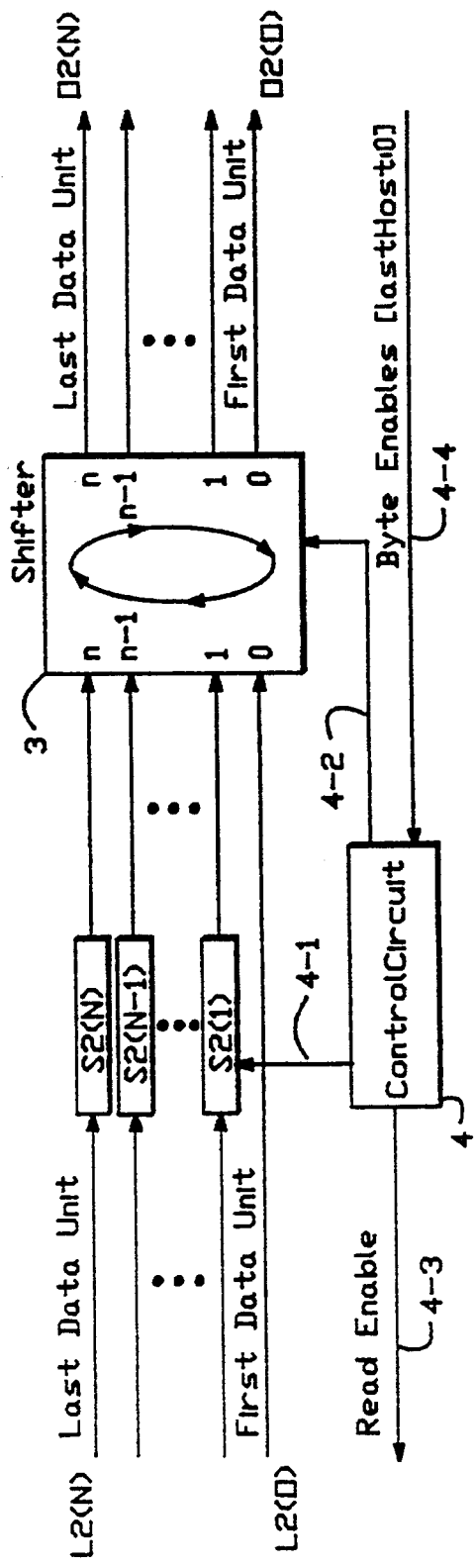

ns patent application entitled DMA DATA PATH
READ AND WRITE DATA ALIGNER AND METHOD

CROSS-REFERENCE TO RELATED APPLICATIONS

The present application is a continuation-in-part of pending U.S. patent application entitled DMA DATA PATH ALIGNER AND NETWORK ADAPTOR UTILIZING SAME, Ser. No. 07/947,055, filed Sep. 18, 1992, U.S. Pat. No. 5,392,406, which was owned at the time of invention and is currently owned by the same assignee.

BACKGROUND OF THE INVENTION

FIELD OF THE INVENTION

The present invention relates to the alignment of data segments in a data path. In particular, the present invention relates to the alignment of data segments in transferring data between a host bus and a buffer.

DESCRIPTION OF RELATED ART

In peripheral devices, such as network adapters, high speed sequential access to a first-in-first-out (FIFO) buffer is generally required. In the interest of cost, complexity and minimization, it is generally desirable to implement the FIFO buffer such that all accesses are of a fixed width and alignment. For example, only fixed width 32-bit reads and writes are allowed. However, this places a burden on the driving software because it must assemble the 32-bit words from non-aligned bytes of data transferred between the FIFO buffer and the host bus.

For example, during a host bus write cycle, only 2 bytes of a 32-bit word in bit positions 8 through 23 of a 32-bit host data bus may be transferred to the buffer. In the next host data bus write cycle, the host bus may transfer 3 more bytes in data bus bit positions 0 through 23.

The driving software would have to copy the first 2 bytes and align them with the first two bytes of the 3 bytes transferred in the second write cycle before writing a full 32 bit aligned word to the buffer. Consequently, the driving software is required to assemble and align bytes of data positioned in various data bus bit positions to form an aligned 32-bit word.

Similarly, a host may require bytes of data in a FIFO buffer to be positioned at certain bit positions on a 32-bit host data bus. For example, a host may require the first 2 bytes of a 32-bit data word in FIFO memory to be positioned at host data bus bit positions 8 through 23. Moreover, the host may desire the last byte of a 32-bit word in FIFO memory to be concatenated and transferred with the first byte of the next addressed 32-bit word.

Thus, the driving software is also required to assemble bytes of data from various buffer memory locations and position the bytes on host specified data bus bit positions.

Therefore, it is desirable to provide data alignment logic that allows a fixed width, fixed byte aligned, buffer to be accessed via reads and writes of arbitrary widths and arbitrary byte alignments without requiring additional driving software. In addition, the data alignment logic must not impose performance limitations on the host architecture such as requiring redundant writes or reads, to or from, a single buffer location.

SUMMARY OF THE INVENTION

The present invention provides an apparatus for transferring data from an input data path having N+1 byte lanes to an output data path having N+1 byte lanes. The apparatus comprises a write data aligner and a read data aligner. The write data aligner aligns bytes of data written in a subset of the set of N+1 input byte lanes in order to output bytes of data on the N+1 output byte lanes. The write data aligner outputs bytes on each output byte lane without requiring multiple write cycles per subset of bytes written to the input data path.

The read data aligner outputs bytes of data on a subset of the output byte lanes from bytes of data transferred on each input byte lane. In the subset, each output byte lane transfers a byte of data without requiring multiple read cycles per byte of data read in the subset.

According to one aspect of the invention, the write data aligner includes N+1 input byte lanes L1(i), for i equals to 0 through 3 and N+1 output byte lanes O1(i), for i equals to 0 through 3. Shifting means supplies bytes of data from respective input byte lanes L1(i) to selected shifting means outputs.

The write data aligner also includes a first-stage pipeline. The stage includes N selector/registers S1(i) for staging bytes of data from the shifting means outputs to the N+1 output byte lanes O1(i). The N selector/registers S1(i) in the first stage of the pipeline each have a storage element R(i) for storing a byte of data and a selector M(i). The respective selectors M(i) supply a byte of data from a selected shifting means output or a register R(i) output.

Control means is coupled to the shifting means and the stage for supplying a first and second signal. The control means also includes means for determining the difference between the number of storage elements R(i) storing a byte of data and the number of input byte lanes L1(i) not transferring a byte of data. The shifting means supplies a byte of data to a selected shifting means output in response to the difference.

According to another aspect of the invention, the read data aligner includes an input data path having N+1 byte lanes L2(i) and an output data path having N+1 byte lanes O2(i). The read data aligner also includes a stage of N selector/registers S2(i) having a storage element R(i) for storing data and selector M(i) for each selector/register S2(i). However, the stage in the read data aligner has inputs coupled to the N input byte lanes L2(i) and outputs supplying bytes of data to a shifting means. The shifting means allows for bytes of data from either the register R(i) outputs or byte lanes L2(i) to be selective supplied to the output byte lanes O2(i).

Control means is coupled to the shifting means and stage supplying a first and second signal. The control means also includes means for determining the number of bytes of data presently outputted from byte lanes O2(i) and a number of bytes of data subsequently outputted from byte lanes O2(i).

According to another aspect of the invention, the write data aligner and read data aligner are coupled to a host bus and a buffer. The N+1 input byte lanes L1(i) are connected to the host bus and the N+1 output byte lanes O1(i) are coupled to a buffer.

Similarly, the read data aligner has N+1 input byte lanes L2(i) coupled to a buffer and N+1 output byte lanes O2(i) coupled to a host bus.

According to another aspect of the invention, a device for transferring data units between a host system and a network is provided. The device includes a bus interface coupled to the host bus and a means for receiving a valid data unit signal from the host system. The device also includes a buffer having a plurality of memory locations for storing each data unit. The buffer is also coupled to a network controller which transfers the data units to a network. A data path couples the bus interface and the buffer with a data path aligner as described above, provided in the data path.

As can be seen the data aligner of the present invention provides for transferring segments of data of arbitrary width and alignment, such as is necessary for efficient operation of peripheral devices like network adapters, without requiring additional driving software.

Other aspects and advantages of the present invention can be seen upon review of the figures, the detailed description, and the claims which follow.

BRIEF DESCRIPTION OF THE FIGURES

FIG. 1 is a simplified block diagram of a write data aligner according to the present invention.

FIG. 2 is a simplified block diagram of a read data aligner according to the present invention.

DETAILED DESCRIPTION

A detailed description of preferred embodiments of the present invention is provided with respect to the Figures.

Figure 5A:
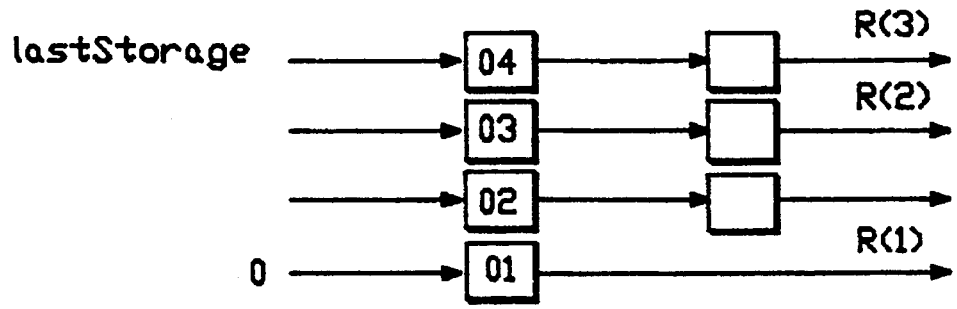
FIGS. 5A–B illustrate the operation of the queuing registers R(i) in selector/register S2(i) in FIG. 2 according to the present invention.
Figure 5B:
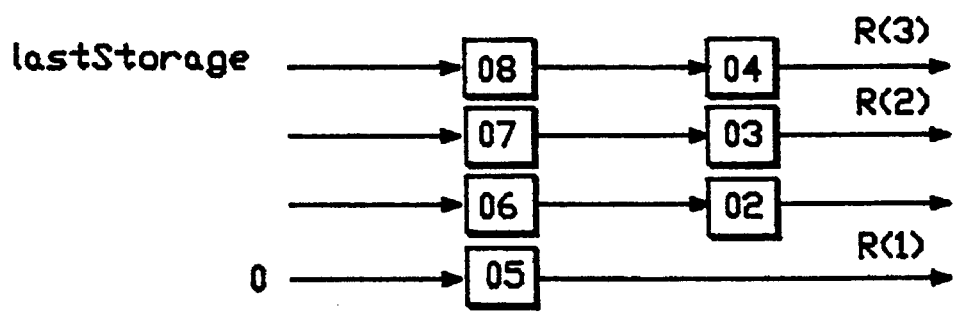
Figure 6:
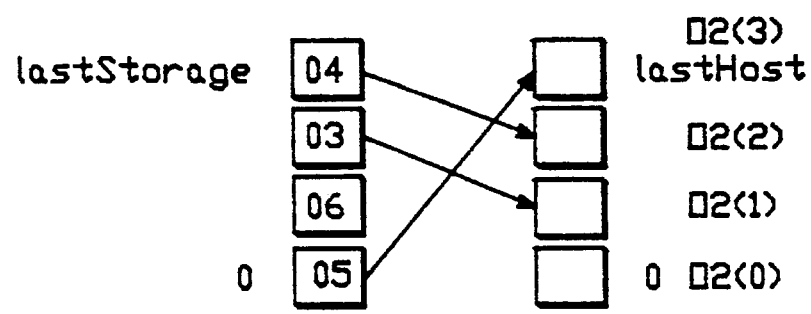
FIG. 6 illustrates the operation of the shifter in FIG. 2 according to the present invention.
Figure 7:
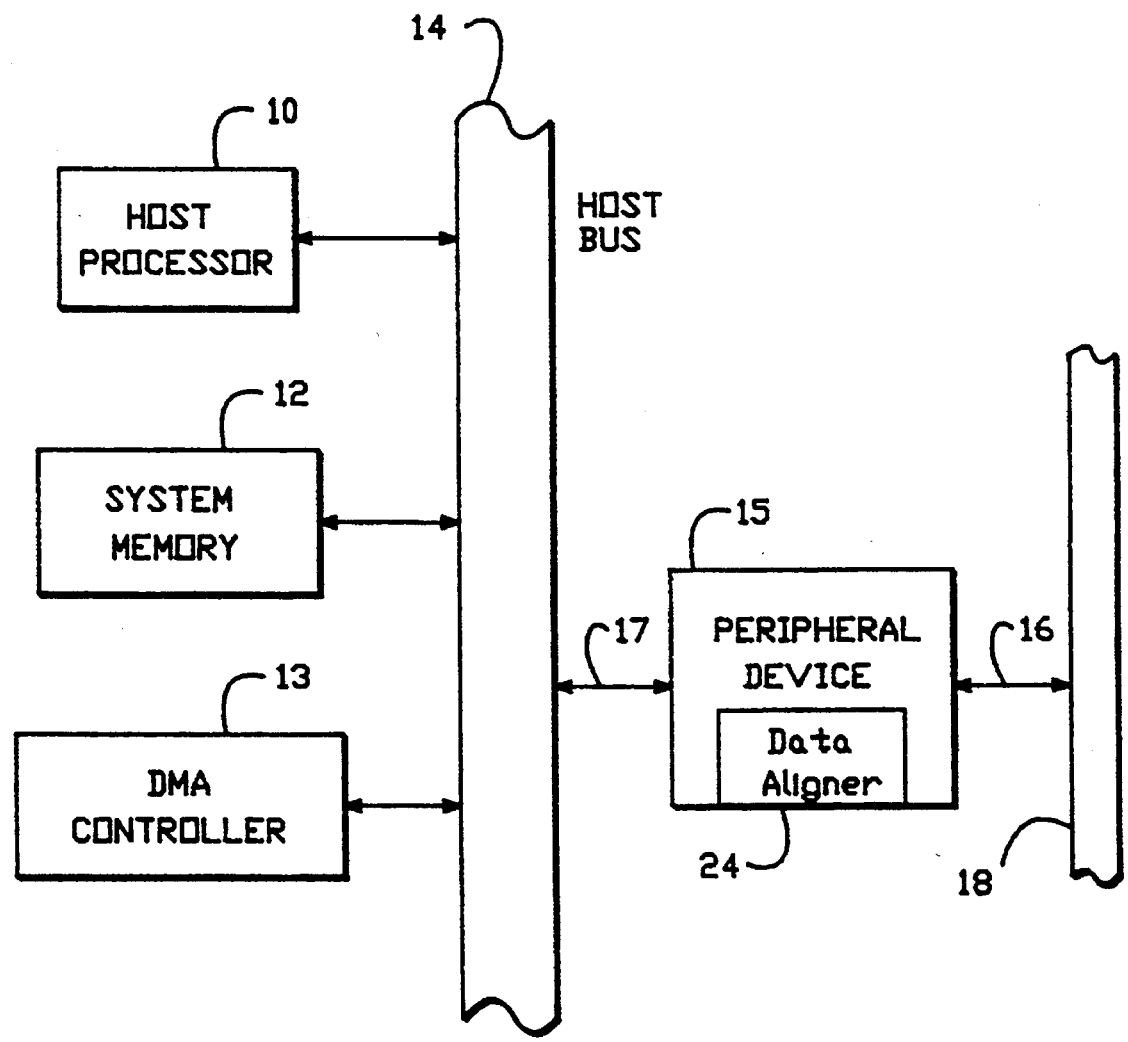
FIG. 7 is a block diagram of a system with a peripheral device using the data aligner according to the present invention.

FIGS. 1–6 provide a functional overview of the data aligner of the present invention. FIGS. 1, 3A–C and 4A–C illustrate the operation of the write data aligner. FIGS. 2, 5A–B and 6 illustrate the operation of the read data aligner. FIG. 7 illustrates the application of the invention in a host system. FIGS. 8–14 provide a detailed description of a peripheral device utilizing the present invention.

I. Functional Overview and Application

A. Write Data Aligner

FIG. 1 is a simplified block diagram of a write data aligner. As can be seen in FIG. 1, the write data aligner includes a plurality of input segment lanes L1(0) through L1(N). In the preferred embodiment, the N+1 input segment lanes are coupled to a host data bus. Each segment lane L1(0) through L1(N) is used to transfer segments of data from the host data bus to shifter 1. In the preferred embodiment, each lane L1(i), for i equals 0 through i equals 3, includes a byte of data. Accordingly, a 4 byte data word may be transferred on segment lanes L1(0) through L1(3).

The byte of data in one embodiment is 8 bits. The term byte, as used herein, is a familiar terminology to those skilled in the art. The invention may be applied to segments of data of any size, one bit per lane up.

The write data aligner also includes a plurality of output segment lanes O1(0) through O1(N). In the preferred embodiment, the N+1 output segment lanes are coupled to a buffer. Each segment lane O1(0) through O1(N) is used to transfer segments of data from the write data aligner to a buffer. In the preferred embodiment, each lane O1(i), for i equals 0 through i equals 3, includes a byte of data. Accordingly, a 4 byte data word may be transferred on segment lanes O1(0) through O1(N).

In describing the data on segment lanes L1(i), the terms "first data unit" and "last data unit" are used to describe the least significant and most significant data units of a data word being transferred. The terms "least significant" and "most significant" are not used because of two competing processor architectures. Using one processor architecture, a 32-bit data word having four bytes of hexadecimal data 04 03 02 01 stored in a single memory location would be accessed as a series of bytes as follows: 01, 02, 03, 04. The "least significant" byte of data would be accessed first. On the other hand, a second processor architecture would access the same 32-bit data word as the following series of bytes: 04, 03, 02, 01. With regard to the data path aligner, it is not the significance of the data unit or byte that matters, but rather the order in which they are accessed as a sequence of fundamental data units. Therefore, when the term "last data unit" is used, those using the second processor architecture would translate it to "least significant byte." Those using the first processor architecture would translate "last data unit" to mean "most significant byte."

As mentioned above, there may be circumstances when the host does not write a full valid 32-bit word on the host bus and a full 32-bit word must be assembled and aligned before writing to a buffer. Table 1, seen below, illustrates how bytes of data which are written to input segment lanes L1(0) through L1(3) are outputted on output segment lanes O1(0) through O1(3) according to the present invention. The numbers two digit numbers under the L1(i) columns represent sequential bytes of data written to segment lanes L1(i) during a host bus write cycle. Each row in Table 1 represents a write cycle having various bytes positioned on various segment lanes. The "- -" under the L1(i) columns represents an invalid or missing data byte written to a L1(i) segment lane. For example, bytes 10 and 11 are written on input segment lanes L1(1) and L1(2), respectively, during the fourth write cycle. Bytes 10 and 11 are aligned with bytes 09 and 12 and outputted on output segment lanes O1(i) to the buffer during the fifth write cycle.

The write data aligner outputs a full 32-bit data word on segment lanes O1(3) through O1(0) from bytes of data placed on various segment lanes L1(i) during various write cycles. As can be seen, the write data aligner writes to a fixed width buffer from non-aligned and arbitrary width data inputs

TABLE 1

| Data Written to: | | | | Data Outputted from: | | | |
|---|---|---|---|---|---|---|---|
| L1(3) | L1(2) | L1(1) | L1(0) | O1(3) | O1(2) | O1(1) | O1(0) |
| 04 | 03 | 02 | 01 | 04 | 03 | 02 | 01 |
| — | — | — | 05 | | | | |
| 09 | 08 | 07 | 06 | 08 | 07 | 06 | 05 |
| — | 11 | 10 | — | | | | |
| 12 | — | — | — | 12 | 11 | 10 | 09 |
| — | 13 | — | — | | | | |
| — | — | 14 | — | | | | |
| — | — | — | 15 | | | | |
| 18 | 17 | 16 | — | 16 | 15 | 14 | 13 |
| 22 | 21 | 20 | 19 | 20 | 19 | 18 | 17 |
| — | — | 24 | 23 | 24 | 23 | 22 | 21 |

In the more general case, the data word in a write data aligner may be positioned on data segment lanes 0 through LAST HOST, where 0 is the first host bus segment lane and LAST HOST is the last host bus segment lane. Similarly, LAST STORAGE is the last segment lane on the buffer bus and 0 is the first segment lane on the buffer bus. Using these parameters, the width of the host data bus and buffer data bus would be equal to LAST HOST +1 and LAST STORAGE +1, respectively.

The write data aligner in FIG. 1 comprises three primary elements: shifter 1, a plurality of first stage selector/registers S1(i), for i equals 0 through i equals N−1 and control circuit 2. Shifter 1 has 0 through N inputs and 0 through N outputs. In the preferred embodiment, each of the plurality of first stage selector/registers S1(i) includes a queuing register R(i) and a bypass multiplexer M(i).

The input data path segment lanes L1(0) through L1(N) are coupled to 0 through N shifter 1 inputs, respectively.

The 0 through N shifter 1 outputs are coupled to the plurality of selector/registers S1(i) for i equals 0 through i equals N−1, respectively. The Nth output of shifter 1 is tied directly to output segment lane O1(N). The selector/registers S1(0) through S1(N−1) are then coupled to output segment lanes O1(0) through O1(N−1), respectively.

Control circuit 2 is coupled to shifter 1 by line 2-1. Control circuit 2 is also coupled to the plurality of selector/registers S1(0) through S1(N-1) by line 2-2. BYTE ENABLES [LAST HOST:0] signal is input to control circuit 2 on line 2-3. Control circuit 2 then outputs WRITE ENABLE signal on line 2-4.

The following several paragraphs describe the functionality of the elements in the write data aligner.

1. Shifter

The first element in the write data aligner is shifter 1. The purpose of shifter 1 is to place the first valid data unit next to the last data unit in the selector/registers S1(i). For example, in FIG. 3A, if two data units 01 and 02 were queued in the queuing registers in selector/register S1(0) and S1(1) and a write contained three valid data units, 03, 04, 05, where the first data unit, 03, was in data segment lane L1(0), then shifter 1 must rotate the data so that the data unit 03 in lane L1(0) will align with selector/register S1(2). This would have the effect of stacking the data units without any gaps.

Figure 3A:
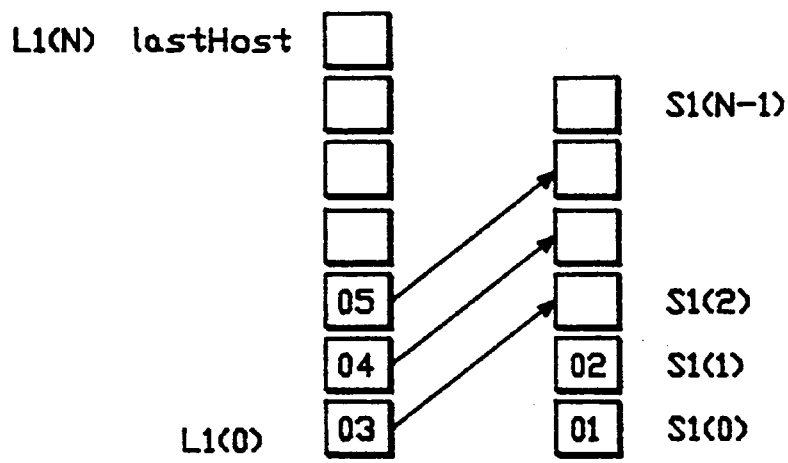
FIGS. 3A–C illustrate the operation of the shifter in FIG. 1 according to the present invention.
Figure 3B:
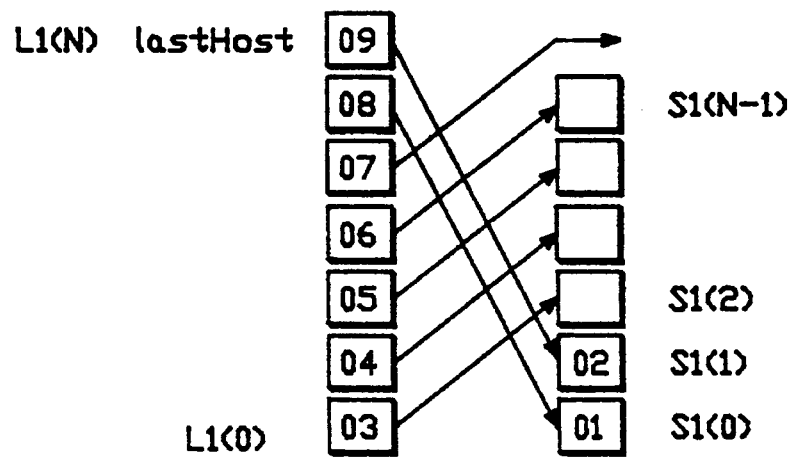

FIG. 3B illustrates L1(0) through L1(N) or LAST HOST being aligned with selector/register S1(i) but all input lanes L1(i) contain valid data. The data units 03 through 06 are rotated to selector/registers S1(2) through S1(N−1). The last two data units 08 and 09 are wrapped around and become aligned with the first two selector/registers S1(0) and S1(1). These data units will be queued for subsequent writing to the data storage element.

Figure 3C:
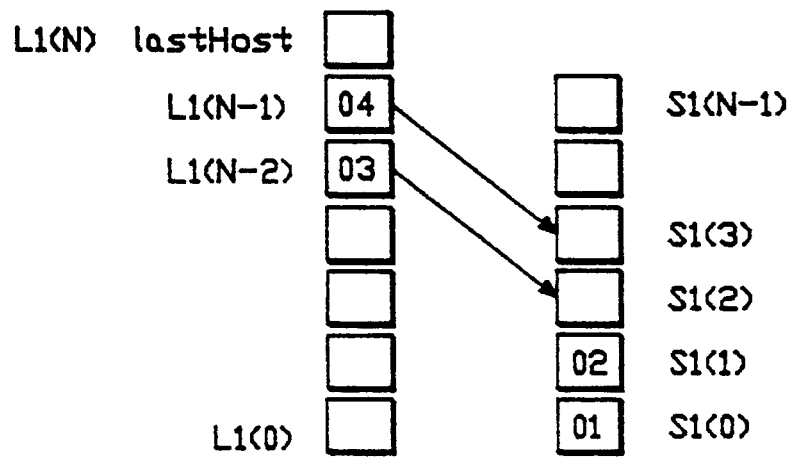

Finally, FIG. 3C is an example where shifter 1 must shift the data in the opposite direction in order to accomplish the task of assembling gap-free data words. Data units 03 and 04 in data segment lanes L1(N−2) and L1(N−1) must be shifted down to selector/registers S1(2) and S1(3), respectively.

In order to perform the shifting shown in FIGS. 3A–C, control circuit 2 must make two determinations.

First, the number of input segment lanes L1(i) that are unused must be determined. In other words, the number of segment lanes L1(i) between the first segment lane and the first segment lane transferring data represents the DATA OFFSET value. In determining the number of segment lanes L1(i) that are unused, there is no need to test the last segment lane. Because, for any valid write cycle, at least one segment lane must carry a data unit.

Second, the number of data units currently held in selector/registers S1(0) through S1(N−1) must be determined. The number of queued data units, or the CURRENT QUEUED value, represents the state value of control circuit 2.

For proper data alignment, the difference between the alignment of the current write and the number of valid data units queued must be eliminated. Hence, the number of positions to rotate the data or the ROTATE value is equal to the difference between the CURRENT QUEUED value and the DATA OFFSET value. For example in FIG. 3C, if we assume that LAST STORAGE equals 6, then CURRENT QUEUED value (2) minus DATA OFFSET value (4) equals −2. If the ROTATE value is greater than LAST STORAGE, LAST STORAGE +1 should be subtracted from the ROTATE value. However, if ROTATE value is less than zero, LAST STORAGE +1 should be added to ROTATE value. Accordingly, adding seven yields a ROTATE value of five. If the host write data is rotated up and around five positions, the data will be properly aligned.

2. Queuing Registers

As mentioned above, each of the selector/registers S1(i) includes a queuing register or storage element R (i), for i equals 0 through i equals N−1.

The queuing registers R(i) are used to store data between bus write cycles in order to build full data words. Data words are built from the first data unit to the last data unit. The host may write anywhere from 1 through LAST HOST +1 data words in a single write. The queuing registers R (i) may contain anywhere from 0 through LAST STORAGE data units at any time. If the current write combined with the queued data fails to build a full data word, the write data must be concatenated to the queued data and held until a full data word can be assembled. Likewise, if the combination of the host write data and queued data exceeds LAST STORAGE +1, then the excess data must be queued for a future write.

Figure 4A:
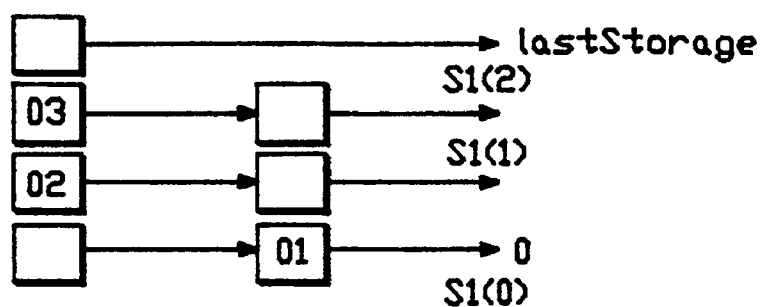
FIGS. 4A–C illustrate the operation of the selector/register S1(N–1) in FIG. 1 according to the present invention.

In FIG. 4A, the combination of current write data (data units 02 and 03) and queued data (data unit 01) is insufficient to build a full data word. Therefore, the two write data units 02 and 03 must be queued in selector/register S1(1) and S1(2), or specifically storage element R(1) and R(2), respectively, until at least one more data unit is written.

Figure 4B:
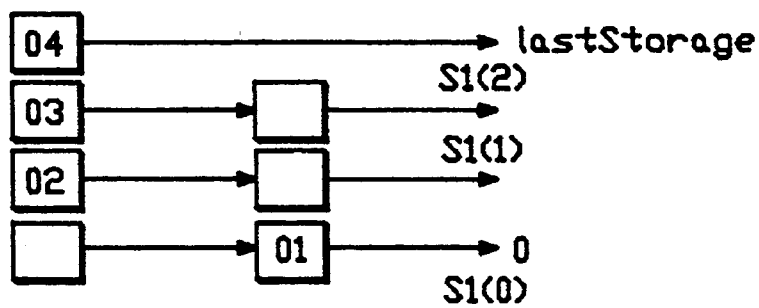

In FIG. 4B, the data supplied (data units 02, 03 and 04) is exactly enough to build a full data word. Therefore, the data will be immediately written to the storage element and there is no need to queue the written data in selector/registers S1(1) and S1(2).

Figure 4C:
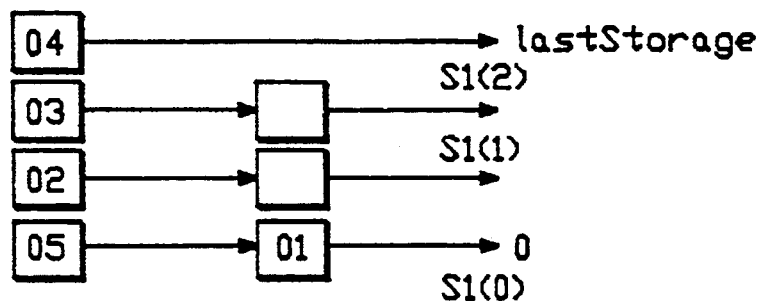

Finally, as shown in FIG. 4C, the number of data units written (data units 05, 02, 03 and 04) combined with previously queued data (data unit 01) results in an excess of data. The queued data (data unit 01) in selector/register S1(0) along with data units 02, 03, 04 are combined into a full data word and are written into the buffer. The last write data unit 05 must be queued in selector/register S1(0) for eventual combination with further write data.

From FIGS. 4A–C, three rules of operation for the queuing registers can be derived.

First, if the sum of the number of valid data units in the host write data word and the number of data units currently queued equals LAST STORAGE +1, then no queuing is required.

Second, if the sum of the number of valid data units in the host write data word and the number of data units currently queued is less than LAST STORAGE +1, then all of the data units in the host write data word must be queued. The queuing registers that are enabled to receive new data are those just beyond the currently queued data.

Third, if the sum of the number of valid data units in the host write data word and the number of data units currently queued is greater than LAST STORAGE +1, then those host write data units that are in excess of those required to build a data word of LAST STORAGE +1 data units must be queued. In this case, all queuing registers R(i) are enabled.

Finally, control circuit 2 must keep track of how many data units are currently held within the queuing registers R(i).

3. Bypass Multiplexers

As described above, each of the plurality of selector/registers S1(i) includes a selector M(i), for i equals 0 through i equals N−1. In the preferred embodiment, the selector is a two input bypass multiplexer.

These bypass multiplexers are used to bypass the respective queuing registers R(i). If the queuing registers are empty and the host is writing a complete data word, then there is no need to perform any shifting and using the queuing registers would introduce alignment errors. Therefore, the queuing registers need to be bypassed.

For a general write case, bypassing queuing registers that contain valid data should not occur.

Finally, a WRITE ENABLE signal for use by the buffer must be generated whenever a full data word has been assembled by the write data aligner. The rules for this function are quite simple: Whenever the sum of the valid host write data units and currently queued data units equal or exceeds the width of the buffer, a write must be enabled.

B. Read Data Aligner

FIG. 2 is a simplified block diagram of a read data aligner. Similarly to the write data aligner, the read data aligner has the same structural elements as the write data aligner. However, the purpose of each of the elements are quite different. The purpose of the read data aligner is to align data from a buffer, such that data units appear on the data segment lanes of a host data bus specified by the host. Host reads are allowed to cross buffer word boundaries and may be of arbitrary width and alignment.

The read data aligner includes a plurality of input segment lanes L2(0) through L2(N). In the preferred embodiment, the N+1 segment lanes are coupled to a buffer. Each segment lane L2(0) through L2(N) is used to transfer segments of data from the buffer to selector/registers S2(1) through S2(N). In the preferred embodiment, each lane L2(i), for i equals 0 through i equals 3, includes a byte of data. Accordingly, a 4 byte data word may be transferred on lanes L2(0) through L2(3).

The byte of data in one embodiment is 8 bits. The term byte, as used herein, is a familiar terminology to those skilled in the art. The invention may be applied to segments of data of any size, one bit per lane up.

The read data aligner also includes a plurality of output segment lanes O2(0) through O2(N). In the preferred embodiment, the N+1 segment lanes are coupled to a host data bus. Each segment lane O2(0) through O2(N) is used to transfer a segment of data from the read data aligner to respective host bus lanes. In the preferred embodiment, each lane O2(i), for i equals 0 through i equals 3, includes a byte of data. Accordingly, a 4 byte data word may be transferred on output segment lanes O2(0) through O2(3).

The read data aligner in FIG. 2 comprises three primary elements: a plurality of first stage selector/registers S2(i), for i equals 1 through i equals N, shifter 3 and control circuit 4. In one embodiment, each of the plurality of first stage selector/registers S2(i) includes a queuing register R(i) and a bypass multiplexer M(i). In addition, the read data aligner also includes a shifter 3 having 0 through N inputs and 0 through N outputs.

The input data path segment lanes L2(i), for i equals 1 through i equals N, are coupled to selector/registers S2(i), for i equals 1 through i equals N. The S2(i) selector/registers are coupled to the 1 through N inputs of shifter 3. The input data segment lane L2(0) is coupled directly to shifter 3 input 0. The 0 through N shifter 3 outputs are coupled to the output data segment lanes 02(i), for i equals 0 through i equals N.

Control circuit 4 is coupled to selector/registers S2(i) and shifter 3 by control lines 4-1 and 4-2, respectively. BYTE ENABLES [LAST HOST:0] signal is input to control circuit 4 on line 4-4. Control circuit 4 outputs READ ENABLE signal on control line 4-3.

1. Queuing Registers

The purpose of the queuing register or storage element R(i) in each selector/register S2(i), for i equals 1 through i equals N, is to preserve the previous read value from the buffer. This allows the read data aligner to build a word from data units from two consecutive buffer words. As soon as the host has read the first data unit of a buffer word, the potential exists for the next read to span two consecutive buffer words. Therefore, the read of the first data unit of the current buffer word must cause the remainder of the current buffer word to be loaded into the queuing registers R(i) while the next data word from the buffer is accessed.

The operation of the queuing registers R(i) is shown in FIGS. 5A–B. During the first read, data unit 01 is read by the host. Data units 02, 03 and 04 may also be read at the same time by using the bypass multiplexers M(i) discussed below. The read of data unit 01 causes the remainder of the current data word from the buffer to be loaded in queuing registers R(1), R(2) and R(3), respectively.

At the same time, the next storage element data word is accessed and presented to inputs of the read data aligner as seen in FIG. 5B.

Now, data units 02, 03 and 04, as well as data units 05, 06, 07 and 08 are available to the host data bus. Therefore, if the next read is a full width read (in this case, 4 data units), then data unit 05 can be included in the word presented to the host bus. Similarly, if the host were to read data units 02 and 03 individually, a full width read would be able to return data units 04, 05, 06 and 07 without having to pause to access a new buffer location or require an additional host read cycle.

Control circuit 4 in FIG. 2 requires two pieces of information in order to determine when to queue data and advance to the next buffer data word.

First, control circuit 4 needs to determine how many data units are being requested by the host in a current read cycle or the REQUESTED DATA value. This is done by counting the number of BYTE ENABLE signals that is asserted in BYTE ENABLES [LAST HOST:0] signal generated by the host on line 4-4.

Second, control circuit 4 must keep track of the number of data units that have been read so far. This is done by maintaining a running total of the number of requested data units by the host. The CURRENT READ value is stored in a register that updates the CURRENT READ value with every read cycle by the host. As we are only concerned with the effect of a host read upon the current buffer data word, once the total CURRENT READ value has exceeded LAST STORAGE, the CURRENT READ value in the register is reduced by LAST STORAGE +1. Because the queuing of storage element data and the advance of the buffer to its next data word always occur simultaneously, only a single indication needs to be generated. This indication, READ ADVANCE ENABLE signal, is asserted under two conditions: When CURRENT READ value is 0 or if the sum of the CURRENT READ value and REQUESTED DATA value is greater than STORAGE WIDTH +1.

2. Bypass Multiplexers

If a read data word must be assembled from both queued and current buffer data, then the bypass multiplexers M(i), for i equals 1 through i equals N, are used to bypass the queuing registers R(i), for i equals 1 through i equals N, that contain data that has already been read. The CURRENT READ value that is maintained by control circuit 4 can be used to determine how many of the queuing registers to bypass.

A special case exists when the CURRENT READ value is equal to 0. In this case, all data units that may be read by the host in a current read cycle are on the buffer's data bus; none are in the queuing registers. Therefore, when CURRENT READ value is 0, all of the bypass multiplexers M(i) must be configured to bypass the queuing registers R(i).

3. Shifter

For reads, the purpose of shifter 3 is to align the first unread data unit from the storage element (either queued or not) with the first enabled data lane of the host data bus. FIG. 6 illustrates the operation of shifter 3.

The first unread data unit from the buffer is data unit 03. The position of data unit 03 indicates that the CURRENT READ value is equal to 2 because the first two data units 01, 02 (not shown) of the buffer data word have already been read. As illustrated, the host is performing a read on the last three segment lanes of the data bus. For the present example, N equals 3 and the last three output segment lanes O2(3), O2(2) and O2(1) will output data units. This requires a rotation of data units 03, 04 and 05 to output segment lanes O2(1), O2(2) and O2(3), respectively.

II. System Overview

FIG. 7 is a schematic diagram of a computer system including a peripheral device having a data aligner according to the present invention. The computer system includes a host system, including a host processor 10, system memory 12, and Direct Memory Access (DMA) controller 13, all communicating through a host system bus 14, such as an EISA bus. The computer bus 14 includes address, control and data lines. Typically, for an EISA bus, there are 32 address lines. Various bus architectures may also include 8, 16, or 32 bi-directional data lines.

DMA controller 13 may be used in the computer system for moving blocks of data from one location to the next, while relieving the host processor 10 of the need to generate a long sequence of addresses to accomplish the move. DMA controller 13 is started by an event, and generates the addresses for moving data from a source location, such as system memory 12, to a destination location, such as peripheral device 15. Typically the data in system memory 12 is a large block of data which begins at a source address, and is moved to a destination beginning at a destination address in peripheral device 15.

Peripheral device 15 with data aligner 24 communicates with host bus 14 through lines 17. In addition, peripheral device 15 communicates with network medium 18, such as an Ethernet network medium, over external interface 16.

Figure 8:
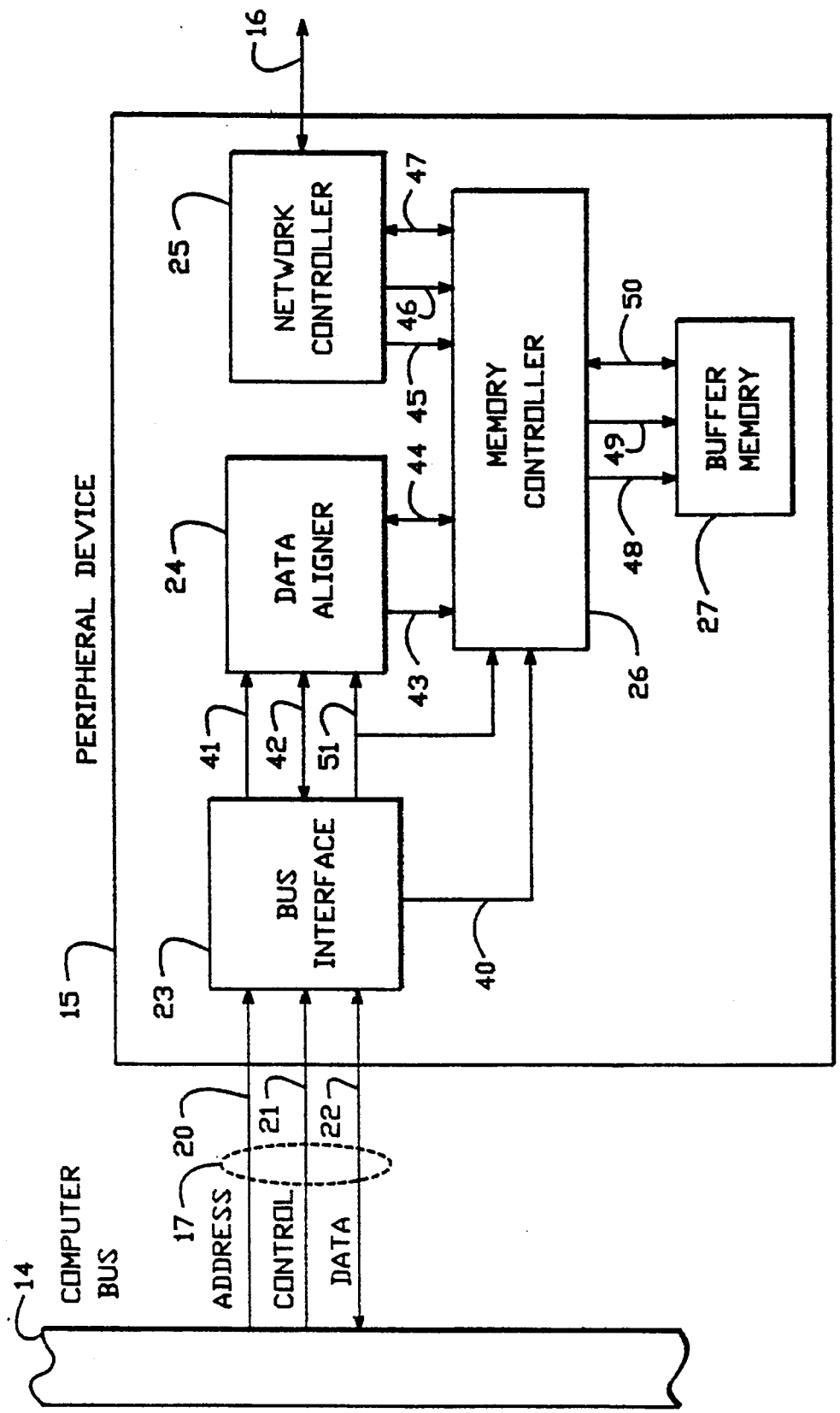
FIG. 8 is a detailed block diagram of the peripheral device in FIG. 7 according to the present invention.

FIG. 8 provides a block diagram of the peripheral device in FIG. 7. Peripheral device 15 is coupled to host bus 14 by address lines 20, control lines 21 and data lines 22 as represented by line 17 in FIG. 7.

Peripheral device 15 includes bus interface 23, data aligner 24, memory controller 26, FIFO buffer memory 27 and network controller 25. In various embodiments, there may be numerous other connections and components not shown having to do with various control and data flow paths.

Bus interface 23 controls the flow of information between host bus 14 and data aligner 24. Host bus 14 is connected to bus interface 23 by address bus 20, control lines 21 and data bus 22.

In the present embodiment, data aligner 24 is coupled between bus interface 23 and memory controller 26. Data transferred to and from the peripheral device is asserted on data bus 42. A BYTE ENABLE signal is asserted on line 41 and a CYCLE STROBE signal is asserted on line 51 to data aligner 24 and memory controller 26. Bus interface 23 is also connected to memory controller 26 by memory address bus 40.

Memory controller 26 controls the flow of data between FIFO buffer memory 27, and data aligner 24 and network controller 25. Memory controller 26 is connected to data aligner 24 by data bus 44 and control line 43. Network controller 25 is coupled to memory controller 26 by data bus 47 and control line 45 and address bus 46. Finally, memory controller 26 is coupled to FIFO buffer memory 27 by data lines 50 and control line 48 and address bus 49.

Network controller 25 provides for the transferring of data on external interface 16 from FIFO buffer memory 27 to a network medium 18, such as an ethernet network.

A. Write Data Aligner Logic.

Figure 9:
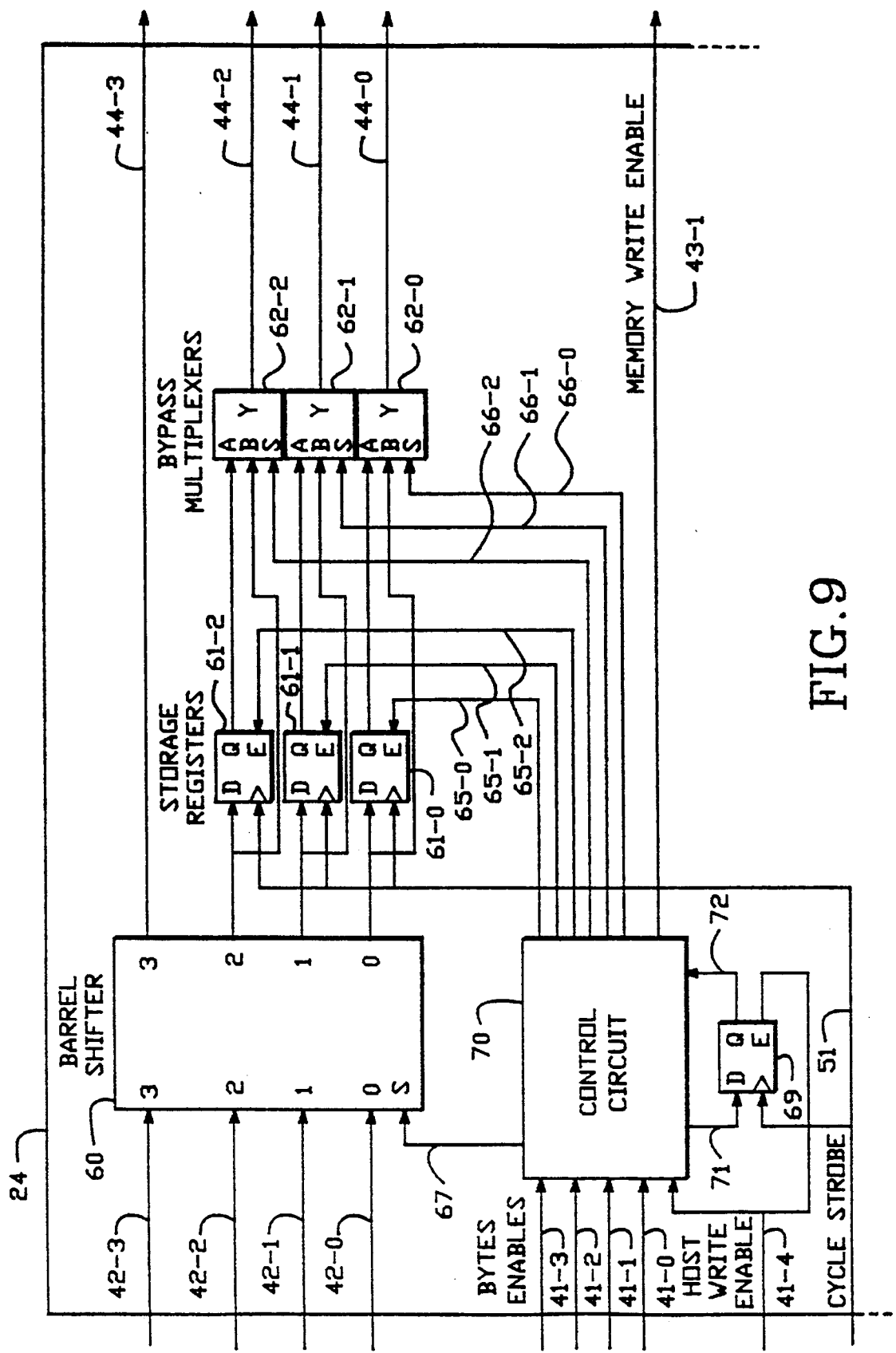
FIG. 9 is a block diagram of the write data aligner according to the present invention.

FIG. 9 illustrates the implementation of the write data aligner in data aligner 24 of FIG. 8. The inputs include byte lanes 42-0, 42-1, 42-2 and 42-3. Each of the input byte lanes may receive 8 bits of write data from bus interface 23. BYTE ENABLE signals are asserted on input lines 41-0, 41-1, 41-2 and 41-3, corresponding to the input byte lanes 42-0, 42-1, 42-2 and 42-3. A BYTE ENABLE signal is asserted on each of the input lines 41 to identify which bytes of data on byte lanes 42 are valid. Input line 41-0 is used for a BYTE ENABLE signal for byte lane 41-0. Input line 41-1 is used for a BYTE ENABLE signal for byte lane 41-1. Input line 41-2 is used for a BYTE ENABLE signal for byte lane 41-2. Finally, input line 41-3 is used for a BYTE ENABLE signal for byte lane 41-3. The two other input lines 41-4 and 51 are used to propagate the HOST WRITE ENABLE signal and the CYCLE STROBE signal, respectively.

The outputs include output byte lanes 44-0, 44-1, 44-2 and 44-3. Each output byte lane may output 8 bits of write data. In addition, MEMORY WRITE ENABLE signal is asserted on output line 43-1.

Barrel shifter 60 has inputs S, 0, 1, 2 and 3 with outputs 0, 1, 2 and 3. Barrel shifter 60 inputs 0, 1, 2 and 3 are connected to input byte lanes 42-0, 42-1, 42-2 and 42-3, respectively. The S input of barrel shifter 60 is connected to control circuit 70 by line 67. Barrel shifter 60 outputs 0, 1, and 2 are coupled to storage registers 61-0, 61-1 and 61-2, respectively. Barrel shifter 60 output 3 is connected directly to byte lane 44-3.

While D-Q type storage registers 61-0, 61-1 and 61-2 are connected directly to barrel shifter 60 outputs 0, 1 and 2, the barrel shifter outputs 0, 1 and 2 are also connected to the B inputs of bypass multiplexers 62-0, 61-1 and 62-2, respectively. The Q outputs of storage registers 61-0, 61-1 and 61-2 are connected to the A input of bypass multiplexers 62-0, 62-1 and 62-2, respectively. Storage registers 61-0, 61-1 and 61-2 are timed by CYCLE STROBE signal on input line 51 which is connected to the clock inputs of the storage registers. Finally, control circuit 70 enables storage registers 61-0, 61-1 and 61-2 by signals on lines 65-0, 65-1 and 65-2 connected to E inputs of storage registers of 61-0, 61-1 and 61-2, respectively.

Bypass multiplexers 62-0, 62-1 and 62-2 have Y outputs coupled to output byte lanes 44-0, 44-1 and 44-2, respectively. Each Y output may output 8 bits of data. Control circuit 70 is connected to the S inputs of bypass multiplexers 62-0, 62-1, and 62-2 by lines 66-0, 66-1, and 66-2, respectively.

Finally, control circuit 70 is coupled to QUEUE COUNT storage register 69. Data lines 71 and 72 are coupled to the D input and Q output, respectively. Register 69 is clocked by CYCLE STROBE signal on line 51 and enabled by HOST WRITE ENABLE signal on line 41-4 which is connected to the E input.

Figure 10:
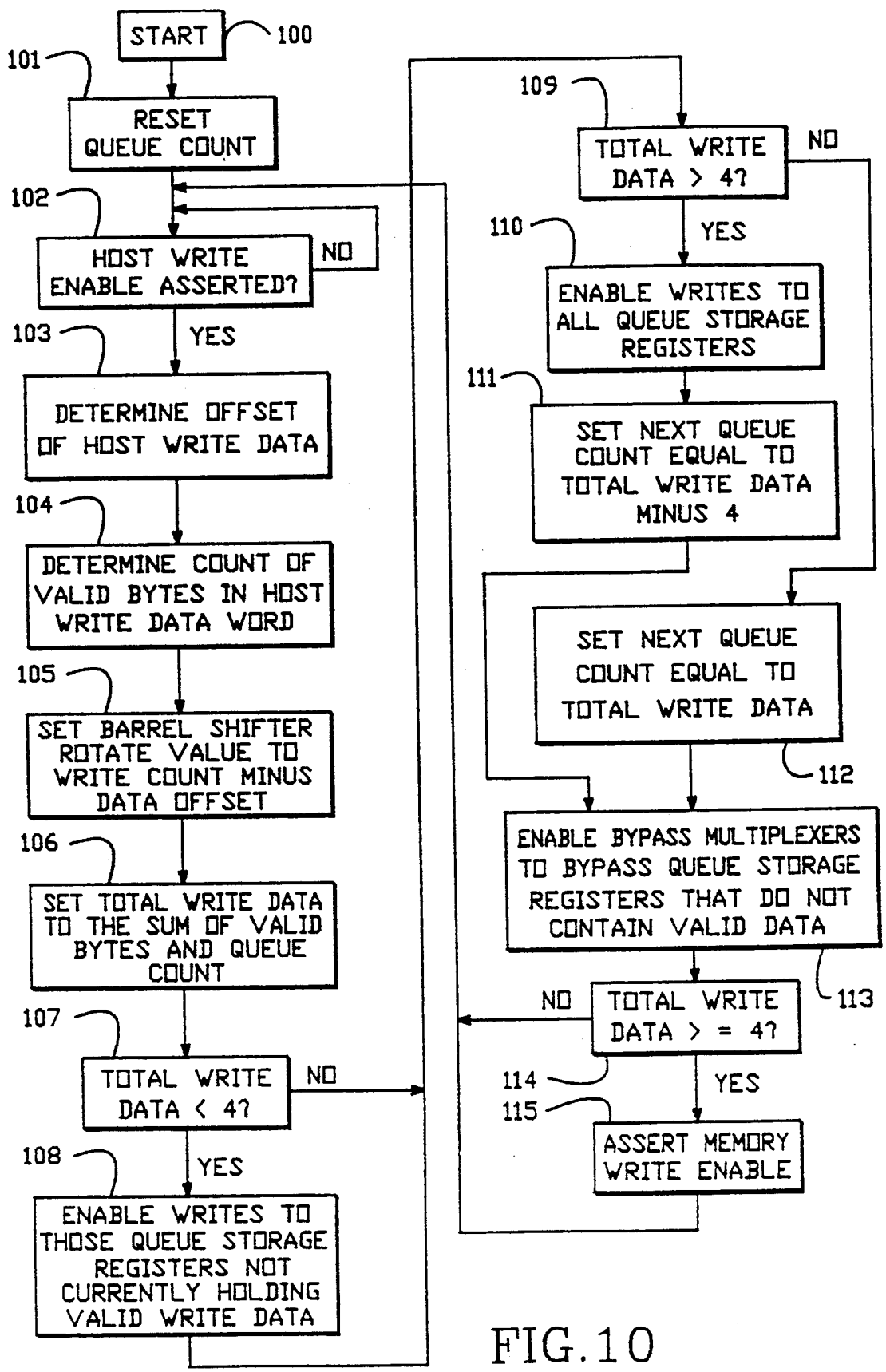
FIG. 10 is a logic flow chart of the write data aligner in FIG. 9 according to the present invention.

FIG. 10 illustrates the operation of the write data aligner of FIG. 9. Although the write data aligner control circuits' operation is depicted as a sequence of steps, in the preferred embodiment, the control circuit is implemented using combinatorial logic or read only memory. After transitioning from block 100, the queue count is reset in block 101. Then, a determination is made whether the HOST WRITE ENABLE signal has been asserted in block 102. If the HOST WRITE ENABLE signal has been asserted, a determination of the offset of the host write data must be determined in block 103; otherwise, the write data aligner will wait for the HOST WRITE ENABLE signal to be asserted. The offset of the host write data in block 103 is ascertained by determining the first valid byte in byte lanes 42-0 through 42-3. For example, if the first valid byte was placed on byte lane 42-1 the data offset value would be equal to 1.

After determining the data offset in block 103, the write data aligner must determine the write count value, or the number of valid bytes on byte lanes 42-0 through 42-3 in block 104.

Block 105 then sets the rotate value to the write count value minus the data offset value.

Block 106 sets the total write data value equal to the sum of the valid bytes on byte lanes 42-0 through 42-3 and the number of bytes queued in storage registers 61-0 through 61-2.

Block 107 then determines whether the total number of bytes or total write data value to be written to the buffer is less than 4. If the value is less than 4, control transitions to block 108; otherwise, the write data aligner transitions to block 109.

If the total write data value is less than 4, storage register 61-0 through 61-2 which are not holding valid write data are enabled in order to allow a write from barrel shifter 60 outputs 0 through 2.

If the total write data value is greater than 4, as determined by block 109, writing to all storage registers 61-0 through 61-2 is enabled in block 110. Otherwise, block 112 sets the next queue count value equal to the total write data value.

If the total write data value is greater than 4 and the write data aligner transitions to block 111, the next queue count value is set to the total write data value minus 4.

Block 113 enables bypass multiplexers 62-0 through 62-2 to bypass storage registers 61-0 through 61-2 which do not contain valid data.

The total write data value is then compared to 4 in block 114. If the value is greater than or equal to 4, MEMORY WRITE ENABLE signal is asserted; otherwise, write data aligner loops back to block 102 for possible further iterations.

Figure 11:
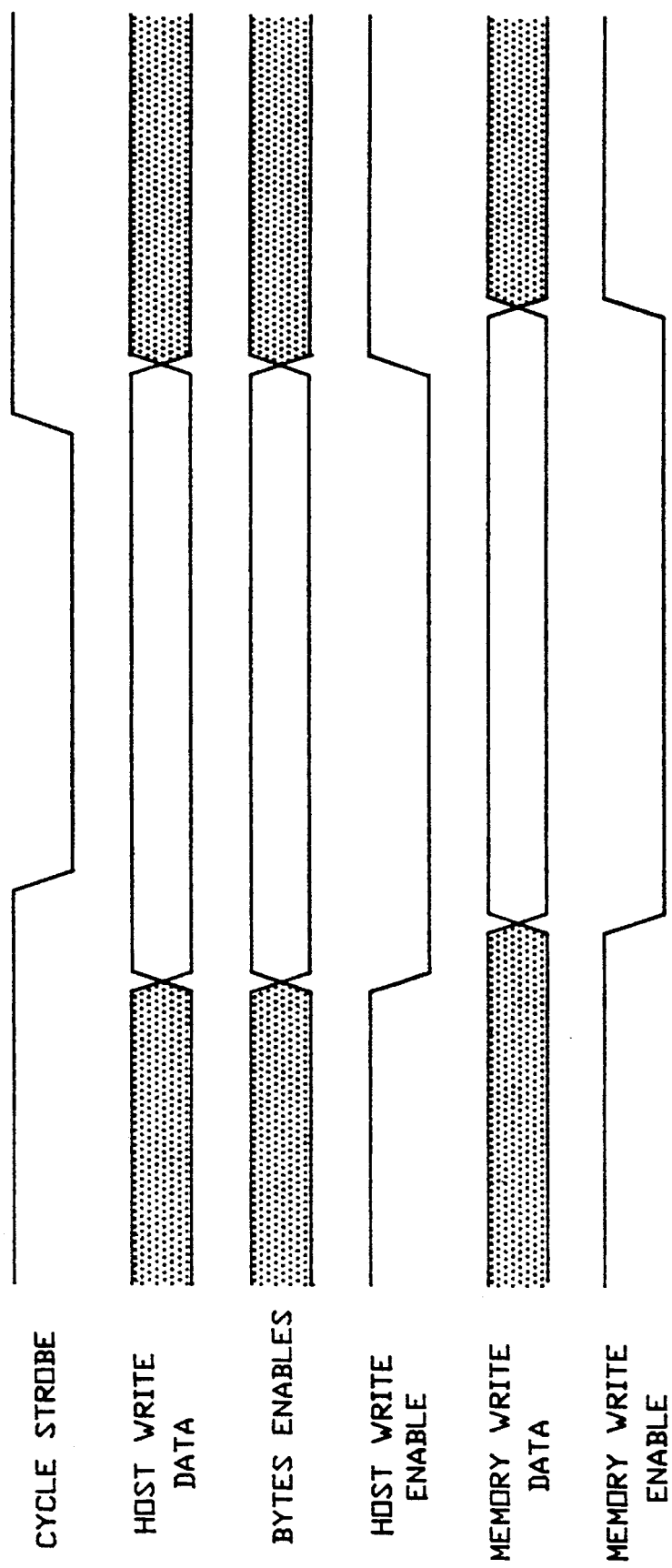
FIG. 11 is a timing diagram of the write data aligner in FIG. 9 according to the present invention.

FIG. 11 illustrates the timing of a typical host write operation. As can be seen from FIG. 11, the HOSTWRITE DATA signals on byte lanes 42-0 through 42-3 and BYTE ENABLE signals on lines 41-0 through 41-3 are latched on the falling edge of the CYCLE STROBE signal. Also, the MEMORY WRITE DATA signals are outputted to the buffer on byte lanes 44-0 through 44-3 during the low period of the CYCLE STROBE signal.

B. Read Data Aligner Logic

Figure 12:
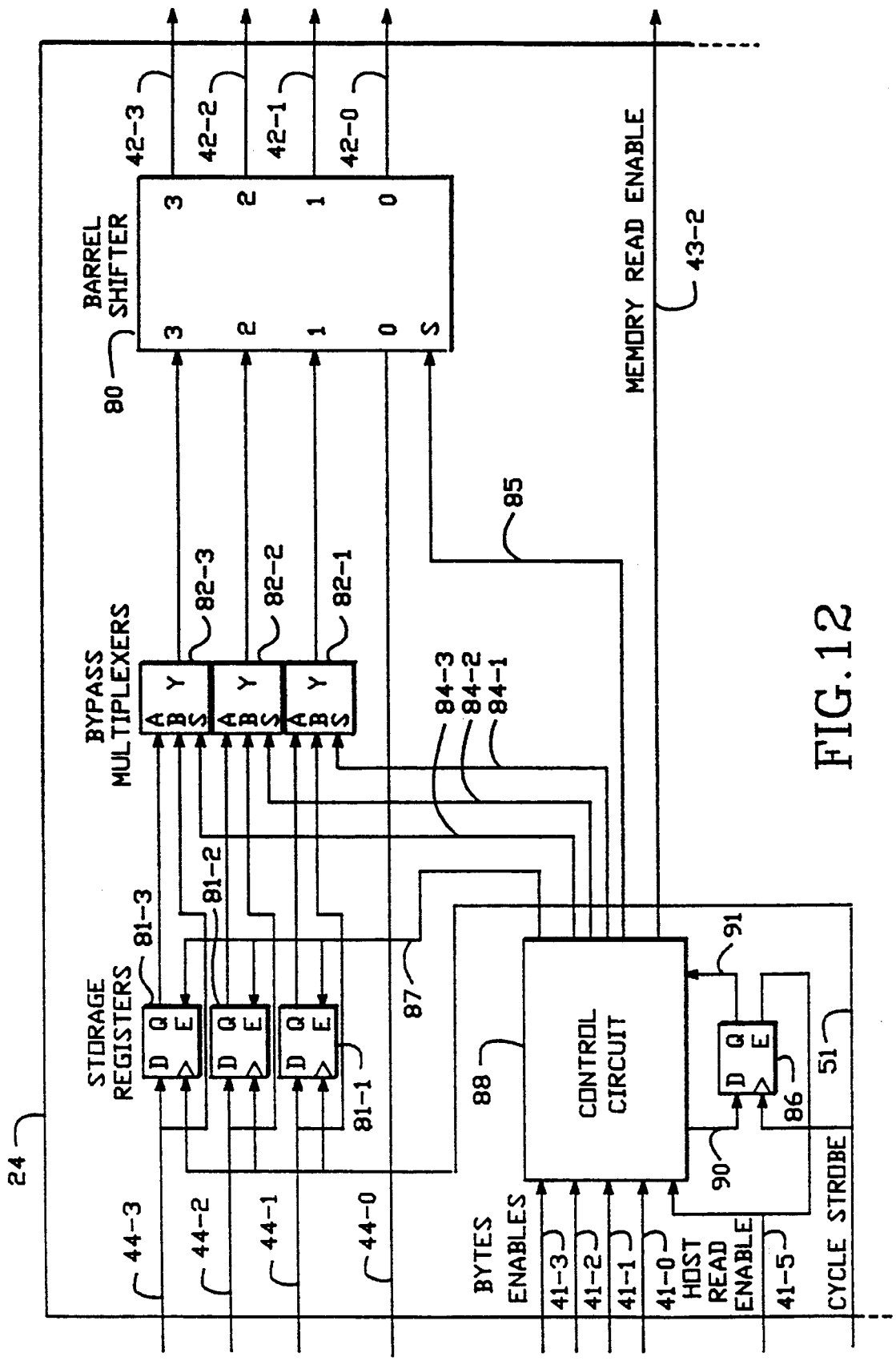
FIG. 12 is a block diagram of a read data aligner according to the present invention.

FIG. 12 illustrates the implementation of a read data aligner in data aligner 24 in FIG. 8. The read data aligner illustrated in FIG. 12 aligns data bytes from FIFO buffer memory 27 which are to be positioned on host bus 14. The inputs include byte lanes 44-0, 44-1, 44-2 and 44-3. Each of the input lanes receives a read byte having 8 bits of buffer memory data. In addition, input lines 41-0, 41-1, 41-2 and 41-3, are coupled to control circuit 88. BYTE ENABLE signals are placed on input lines 41-0, 41-1, 41-2 and 41-3 identifying valid bytes on byte lanes 44-0 through 44-3, respectively. Input line 41-0 is used for the BYTE ENABLE signal for byte lane 44-0. Input line 41-1 is used for the BYTE ENABLE signal for byte lane 44-1. Input line 41-2 is used for BYTE ENABLE signal for byte lane 44-2. Finally, input line 41-3 is used for BYTE ENABLE signal for byte lane 44-3. Other inputs to the read data aligner 24 include input line 41-5 which is connected to control circuit 88 and input line 51 which is connected to clock inputs of D-Q type storage registers 81-1, 81-2 and 81-3. The HOST READ ENABLE signal is asserted on input line 41-5 while the CYCLE STROBE signal is asserted on input line 51.

The outputs of the read data aligner include byte lanes 42-0, 42-1, 42-2 and 42-3. Each of the output lanes supplies 8 bits of data to bus interface 23 and eventually to host bus 14. Also control circuit 88 outputs MEMORY READ ENABLE signal on output line 43-2.

Byte lanes 44-1, 44-2 and 44-3 are connected to D inputs of register 81-1, 81-2, 81-3 and B inputs of bypass multiplexers 82-1, 82-2 and 82-3, respectively. The Q outputs of registers 81-1, 81-2 and 81-3 are connected to the A inputs of bypass multiplexers 82-1, 82-2 and 82-3, respectively. Storage registers 81-1, 81-2 and 81-3 are enabled by signals on line 87 connected to control circuit 88 and the E inputs of the storage registers. In addition, line 51 is connected to the clock inputs of registers 81-1, 81-2 and 81-3.

Bypass multiplexers 82-1, 82-2 and 82-3 are connected to control circuit 88 by control lines 84-1, 84-2 and 84-3, respectively. Signals are placed on control lines 84-1, 84-2 and 84-3 in order to select the A input or B input which is outputted from the Y output of bypass multiplexers 82-1, 82-2 and 82-3, respectively.

Barrel shifter 80 has inputs S, 0, 1, 2 and 3. The Y outputs of bypass multiplexers 82-1, 82-2 and 82-3 are connected to barrel shifter inputs 1, 2 and 3, respectively. Byte lane 44-0 is connected directly to input 0 of barrel shifter 80. Control circuit 88 is connected to the S input of barrel shifter 80 by line 85. Barrel shifter 80 also has outputs 0, 1, 2 and 3 connected to output byte lanes 42-0, 42-1, 42-2 and 42-3, respectively.

Queue count register 86 is coupled to control circuit 88 in order to store the queue count value. The queue count value is inputted on line 90 to D input of register 86. Register 86 is clocked by CYCLE STROBE signal on line 51 which is connected to clock input of register 86. Register 86 is enabled by the HOST READ ENABLE signal on line 41-5 which is connected to E input. The queue count is then outputted from Q output on line 91 to control circuit 88.

Figure 13:
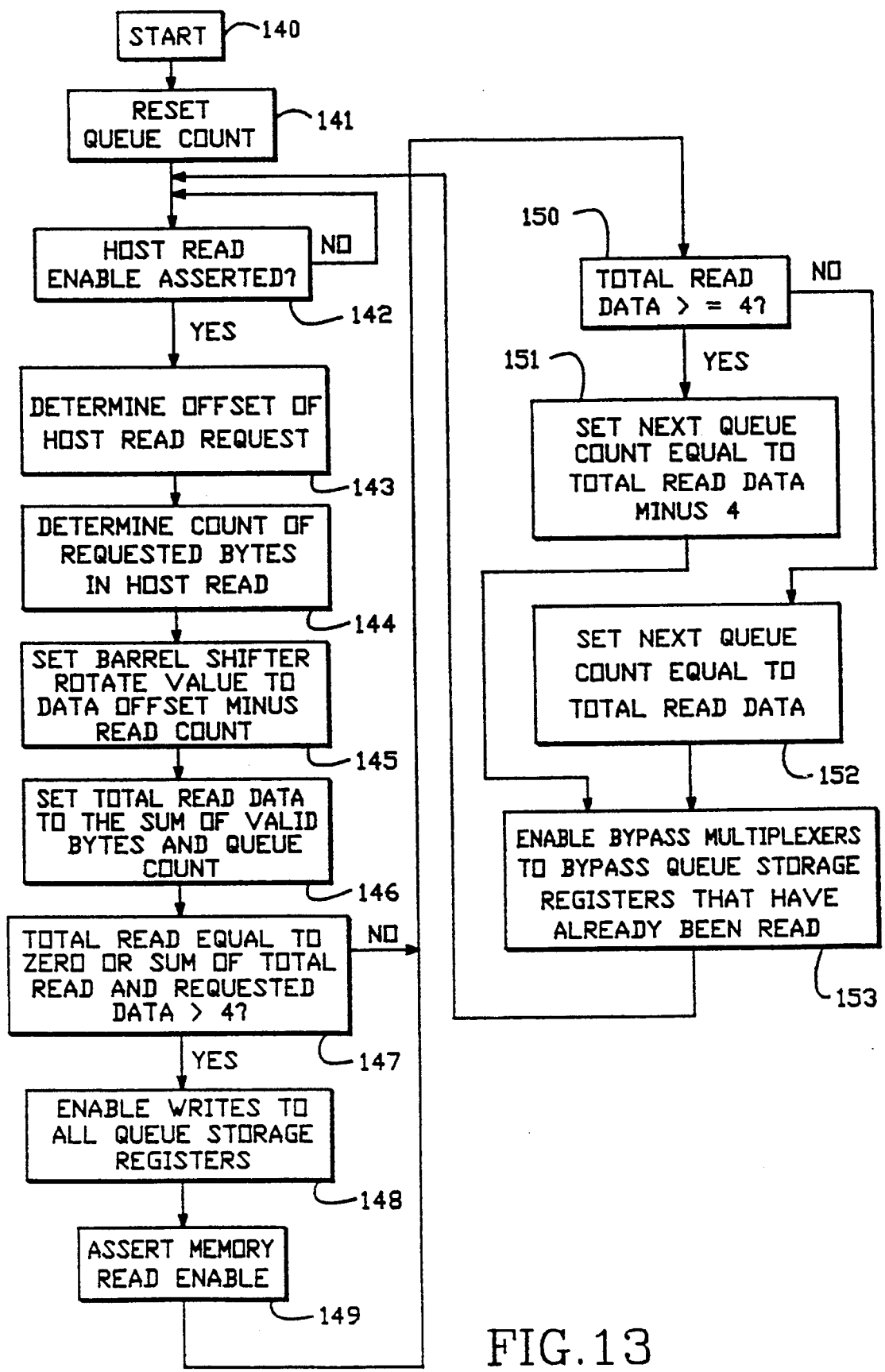
FIG. 13 is a logic flow chart of the read data aligner in FIG. 12 according to the present invention.

As with FIG. 10, FIG. 13 illustrates the operation of the read data aligner of FIG. 12. Although the read data aligner control circuits' operation is depicted as a sequence of steps, in the preferred embodiment, the control circuit is implemented using combinatorial logic or read only memory.

After transitioning from block 140, the queue count value is reset in block 141.

The read data aligner then determines whether a HOST READ ENABLE signal is asserted in block 142. If a HOST READ ENABLE signal is asserted, the read data aligner must determine a data offset value of the host read request in block 143. The data offset value is ascertained by determining the first valid output byte lane transferring buffer data in a BYTE ENABLE signal.

Upon determining the data offset value, the read data aligner must determine the number of bytes requested in the host read or read count value from a BYTE ENABLE signal in block 144.

The rotate value for barrel shifter 80 is then determined by subtracting the read count value from the data offset value in block 145.

The total read data value is then set to the sum of the number of valid bytes requested from the host to be read and the queue count value or number of data units stored in storage registers 81-1, 81-2 and 81-3 in block 146.

In block 147, a determination is made whether the total read value equals 0 or the sum of the total read value and requested data value is greater than 4. If either determination is true, the read data aligner transitions to block 148; otherwise, the read data aligner transitions to block 150.

In block 148, writes to storage registers 81-1 through 81-3 are enabled by a signal on line 87.

In addition, the MEMORY READ ENABLE signal is asserted on line 43-2 in order to input another buffer word on input byte lanes 44-0 through 44-3 in block 149.

Block 150 determines whether the total read data value is greater than or equal to 4. If the total read data value is greater than or equal to 4 the read data aligner transitions to block 151; otherwise, the read data aligner transitions to block 152.

In block 151, the next queue count value is set to the total read data value minus 4. If the total read data value is not greater than or equal to 4 the next queue count value is set to the total read data value in block 152.

Finally, block 153 enables bypass multiplexers 82-1 through 82-3 to bypass storage registers 81-1 through 81-3 which have already been read. The read data aligner then loops back to block 142.

Figure 14:
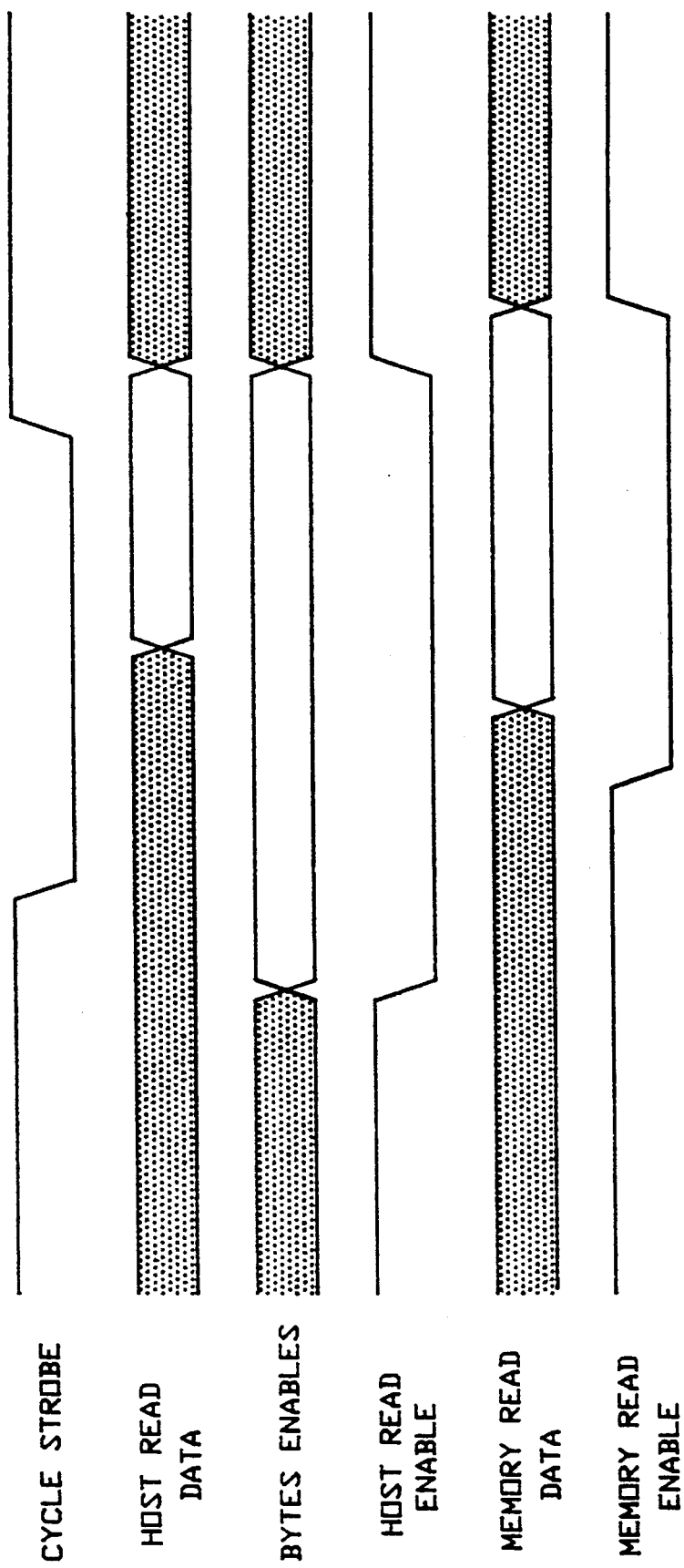
FIG. 14 is a timing diagram of the read data aligner in FIG. 12 according to the present invention.

FIG. 14 illustrates the timing of the read data aligner in FIG. 12. As can be seen from FIG. 14, HOST READ ENABLE signal and BYTE ENABLE signals initiates the operation of the read data aligner. After the BYTE ENABLE signals and HOST READ ENABLE signal are generated from the host, the MEMORY READ ENABLE signal is asserted on line 43-2 and MEMORY READ DATA signals are outputted on byte lanes 44-0 through 44-3. Finally the HOST READ DATA signals are asserted on byte lanes 42-0 through 42-3.

III. Conclusion

In conclusion, the present invention provides a data aligner having a write data aligner and a read data aligner.

The write data aligner allows for writing a fixed width word to a buffer from bytes of data on a host data bus. The write data aligner assembles bytes of data positioned on various byte lanes on the host data bus and aligns a fixed width word which is written to the buffer. The read data aligner allows for aligning read data from a buffer such that the bytes of buffer data appear on host data bus byte lanes specified by the host. Host reads may be allowed to cross buffer word boundaries and may be of any arbitrary width and alignment.

The present invention further provides for a peripheral device, such as a network adapter, using a data aligner in both the read and write paths in a host system. The read and write data aligners allow for the elimination of driver software which would build and align bytes of data, while not imposing any performance limitations on the host system architecture. The host system is not required to perform redundant accesses (reads or writes) either across the host system bus or to the buffer.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for writing segments of data from a host bus to a buffer, the host bus coupled to a first data path having N+1 segment lanes D1(n), for n=0 through N, each segment lane D1(n) for transferring a segment of data, and the buffer coupled to a second data path having N+1 segment lanes D2(n), for n=0 through N, each segment lane D2(n) for transferring a segment of data, comprising:

a control resource having a control output for generating a first control signal and a second control signal which map segments of data from the first data path to the second data path without redundant accesses of segments of data to be transferred, the second data path having a fixed number of the segments of data to be transferred, and the first data path having a selected number and a selected alignment of the segments of data to be transferred;

a first stage including,
a plurality of first stage inputs, coupled to the control resource and the segment lanes D1(n), for n=0 through N, associated with the first data path, for receiving at least a segment of data at a selected first stage input among the plurality of first stage inputs, and
a plurality of first stage outputs for supplying the segment of data at a selected first stage output among the plurality of first stage outputs in response to the first control signal; and a second stage including,
a plurality of second stage inputs coupled to the control resource and a subset of the plurality of first stage outputs, for receiving the segment of data at a selected second stage input among the plurality of second stage inputs, and
a plurality of second stage outputs for supplying the segment of data at a selected second stage output among the plurality of second stage outputs in response to the second control signal and coupling the segment of data to the segment lanes associated with the second data path, the second stage capable of queuing and storing segments of data for selectively aligning the segments of data on selected segment lanes of the second data path.

2. The apparatus of claim 1, wherein the control resource further includes a control input for receiving a segment enable signal for each segment of data on the segment lanes D1(n) to indicate a validity state of the corresponding segment of data, the validity state including a valid state to indicate that the segment lane D1(n) corresponding to the segment enable signal is transferring a valid segment of data, and an invalid state to indicate that the segment lane D1(n) corresponding to the segment enable signal is transferring one of an invalid segment of data and no segment of data.

3. The apparatus of claim 2, wherein the first control signal includes a rotate signal and the second control signal includes an output enable signal.

4. The apparatus of claim 3, wherein the first stage includes:

a shifter for transferring segments of data from the selected first stage input to the selected first stage output, wherein the plurality of first stage inputs includes a plurality of shifter inputs $X1_{in}(j)$, for j=0 through N, corresponding to segment lanes D1(n), for n=0 through N, and the plurality of first stage outputs includes a plurality of shifter outputs $X1_{out}(j)$, for j=0 through N, for transferring segments of data from a selected first stage input $X1_{in}(j)$ to a selected first stage output $X1_{out}(j)$ in response to the rotate signal.

5. The apparatus of claim 4, wherein the second stage includes:

a plurality of queuing stores having store inputs $R_{in}(k)$, for k=0 through N−1, coupled to the shifter at the plurality of first stage outputs $X1_{out}(j)$, for j=0 through N−1, and store outputs $R_{out}(k)$, for k=0 through N−1, for storing the segment of data from the selected shifter outputs in response to a queue enable signal; and a plurality of selectors having selector inputs $M_{in}(m)$, for m=0 through N−1, coupled to the store outputs $R_{out}(k)$, for k=0 through N−1, and shifter outputs $X1_{out}(j)$, for j=0 through N−1, and selector outputs $M_{out}(m)$, for m=0 through N−1, for supplying a selected segment of data to segment lanes D2(n), for n=0 through N−1, at the second data path in response to the output enable signal.

6. The apparatus of claim 5, wherein each selector among the plurality of selectors comprises a 2-to-1 multiplexer (MUX), including:

a first MUX input coupled to a corresponding store output, a second MUX input coupled to a corresponding shifter output, a MUX control input for receiving the output enable signal and selecting one of the first MUX input and the second MUX input, and a MUX output for transferring the selected segment of data on one of the first MUX input and the second MUX input in response to the output enable signal at the MUX control input.

7. The apparatus of claim 5, wherein the control resource generates the rotate signal by determining a data offset value and a current queue value, the data offset value determined by counting the segment lanes D1(n) not transferring segments of data and the current queue value determined by counting the queuing stores storing segments of data, the rotate value equals the current queue value minus the data offset value.

8. The apparatus of claim 7, wherein the control resource determines the data offset value by counting the number of segment enable signals in the invalid state from a lowest segment lane D1(n), for n=0, to a higher segment lane D1(n), for n=1 through N, until the segment lane D1(n) corresponding to the segment enable signal in the valid state is reached.

9. The apparatus of claim 7, wherein the output enable signal includes:

a bypass enable signal for bypassing at least one of the plurality of queuing stores, where the control resource generates the bypass enable signal to select the second MUX input corresponding to the shifter outputs $X1_{out}(j)$, for j=0 through N−1, and a nonbypass enable signal for not bypassing the plurality of queuing stores, where the control resource generates the nonbypass enable signal to select the first MUX input corresponding to the store output.

10. The apparatus of claim 9, wherein the control resource generates the bypass enable signal when a sum of the current queue value and the number of segment enable signals corresponding to segment lanes D1(n) transferring segments of data equals the fixed number of the segments of data on the second data path.

11. The apparatus of claim 10, wherein a desired number of the fixed number of segments of data is N+1.

12. The apparatus of claim 9, wherein the control resource generates the nonbypass enable signal when a sum of the current queue value and the number of segment enable signals corresponding to segment lanes D1(n) transferring segments of data is one of less than N+1 and greater than N+1.

13. An apparatus for reading segments of data from a buffer to a host bus, the host bus coupled to a first data path having N+1 segment lanes D1(n), for n=0 through N, each segment lane D1(n) for transferring a segment of data, and the buffer coupled to a second data path having N+1 segment lanes D2(n), for n=0 through N, each segment lane D2(n) for transferring a segment of data, comprising:

a control resource having a control output for generating a first control signal and a second control signal which map segments of data from the second data path to the first data path without redundant accesses of segments of data to be transferred, the first data path having a selected number and a selected alignment of the segments of data to be transferred, and the second data path having a fixed number of the segments of data to be transferred;

a first stage including a plurality of first stage inputs, coupled to the control resource and a subset of the segment lanes D2(n), for n=1 through N, associated with the second data path, for receiving at least a segment of data at a selected first stage input among the plurality of first stage inputs, and a plurality of first stage outputs for supplying the segment of data at a selected first stage output among the plurality of first stage outputs in response to the first control signal; and a second stage including, a plurality of second stage inputs coupled to the control resource and at least a subset of the plurality of first stage outputs and the segment lanes coupled to the plurality of first stage inputs, for receiving the segment of data at a selected second stage input among the plurality of second stage inputs, and a plurality of second stage outputs for supplying the segment of data at a selected second stage output among the plurality of second stage outputs in response to the second control signal and coupling the segment of data to the segment lanes associated with the first data path where the first stage is capable of queuing and storing segments of data for selectively aligning the segments of data on selected segment lanes of the first data path.

14. The apparatus of claim 13, wherein the control resource further includes a control input for receiving a segment enable signal for each segment of data on the segment lanes $D2(n)$ to indicate a validity state of the corresponding segment of data, the validity state including a valid state to indicate that the segment lane $D2(n)$ corresponding to the segment enable signal is transferring a valid segment of data, and an invalid state to indicate that the segment lane $D2(n)$ corresponding to the segment enable signal is transferring one of an invalid segment of data and no segment of data.

15. The apparatus of claim 14, wherein the first data path is coupled to a host bus, the second data path is coupled to a buffer, the plurality of first stage inputs is coupled to the second data path, and the plurality of first stage outputs is coupled to the first data path.

16. The apparatus of claim 15, wherein the first control signal includes a selector enable signal and the second control signal includes a rotate signal.

17. The apparatus of claim 16, wherein the first stage includes:

a plurality of queuing stores having store inputs $R_{in}(k)$, for k=1 through N, coupled to the subset of the segment lanes $D2(n)$, for n=1 through N, and store outputs $R_{out}(k)$, for k=1 through N, for storing the segment of data from the subset of the segment lanes $D2(n)$, for n=1 through N, in response to a queue enable signal; and a plurality of selectors having selector inputs $M_{in}(m)$, for m=1 through N, coupled to the store outputs $R_{out}(k)$, for k=1 through N, and the subset of the segment lanes $D2(n)$, for n=1 through N, and selector outputs $M_{out}(m)$, for m=1 through N, for supplying a selected segment of data to the selector outputs in response to the selector enable signal.

18. The apparatus of claim 17, wherein the queue enable signal includes a clock strobe signal.

19. The apparatus of claim 17, wherein the second stage includes:

a shifter for transferring segments of data from the selected second stage input to the selected second stage output, wherein the plurality of second stage inputs includes a plurality of shifter inputs $X2_{in}(j)$, for j=0 through N, coupled to the segment lanes $D2(n)$, for n=0, and the plurality of selectors at the selector outputs $M_{out}(m)$, for m=1 through N, and the plurality of second stage outputs includes a plurality of shifter outputs $X2_{out}(j)$, for j=0 through N, for transferring segments of data from a selected second stage input $X2_{in}(j)$ to a selected second stage output $X2_{out}(j)$ in response to the rotate signal.

20. The apparatus of claim 19, wherein the selected second stage output $X2_{out}(j)$ corresponds to the segment lane $D1(n)$ with the lowest n that is enabled for receiving the segment of data.

21. The apparatus of claim 20, wherein the control resource generates the rotate signal by determining a data offset value and a read count value, the data offset value determined by counting the segment lanes $D2(n)$ not transferring segments of data and the read count value determined by counting the segment lanes $D2(n)$ transferring the segments of data the rotate value equals the data offset minus the read count value.

22. The apparatus of claim 21, wherein the control resource determines the data offset value by counting the number of segment enable signals in the invalid state from a lowest segment lane $D2(n)$, for n=0, to a higher segment lane $D2(n)$, for n=1 through N, until the segment lane $D2(n)$ corresponding to the segment enable signal in the valid state is reached.

23. The apparatus of claim 19, wherein each selector among the plurality of selectors comprises a 2-to-1 multiplexer (MUX), including:

a first MUX input coupled to a corresponding store output, a second MUX input coupled to a corresponding subset of segment lanes $D2(n)$, for n=1 through N, a MUX control input for receiving the selector enable signal and selecting one of the first MUX input and the second MUX input, and a MUX output for transferring the selected segment of data on one of the first MUX input and the second MUX input in response to the selector enable signal at the MUX control input.

24. The apparatus of claim 21, wherein the control resource determines the read count value by counting the number of segment enable signals in the valid state.

25. The apparatus of claim 21, wherein the selector enable signal includes:

a bypass enable signal for bypassing at least one of the plurality of queuing stores, where the control resource generates the bypass enable signal to select the second MUX input corresponding to the subset of segment lanes $D2(n)$, for n=1 through N, and a nonbypass enable signal for not bypassing the plurality of queuing stores, where the control resource generates the nonbypass enable signal to select the first MUX input corresponding to the store output.

26. The apparatus of claim 25, wherein the control resource generates the bypass enable signal when a sum of the segments of data in the queuing stores and the segments of data in the segment lanes $D2(n)$, for n=0 through N, equals a desired number of the segments of data.

27. The apparatus of claim 25, wherein the control resource generates the bypass enable signal when all segments of data necessary to satisfy a desired number of the segments of data for the transfer are located on the segment lanes $D2(n)$, for n=O through N, in the first data path.

28. The apparatus of claim 25, wherein the control resource generates the bypass enable signal when the queuing stores contain no segment of data and all segments of data necessary to satisfy a desired number of the segments of data for the transfer are located on the segment lanes $D2(n)$, for n=0 through N.

29. The apparatus of claim 25, wherein the control resource generates the nonbypass enable signal when a sum of the segments of data stored in the queuing stores and the read count value is less than the number of segments of data necessary to satisfy a desired number of the segments of data for the transfer.

30. The apparatus of claim 25, wherein the control resource generates the nonbypass enable signal when a sum of the segments of data stored in the queuing stores and the new count value is greater than the number of segments of data necessary to satisfy a desired number of the segments of data for the transfer.

31. A device for transferring data units from a host system, having a host bus having a plurality of segment data lanes, to a network, comprising:

a bus interface, coupled to the host bus, for transferring a data unit on each segment data lane in a subset of the plurality of segment data lanes during a bus write cycle;

means for receiving a valid data unit signal from the host system;

a buffer, having a plurality of memory locations, for storing each data unit;

a data path between the bus interface and the buffer;

a network controller, coupled to the buffer and the network, for transferring a data unit between the buffer and the network; and a data aligner, in the data path, for controlling alignment of each data unit in the data path in response to the valid data unit signal so that the data units having a selected width and selected alignment are transferred on the subset and sequentially stored in the plurality of buffer memory locations having a fixed width and fixed alignment without requiring redundant writes of any transferred data unit in the subset.

32. A device for transferring data units from a network to a host system having a host bus having a plurality of segment data lanes, comprising:

a bus interface, coupled to the host bus, for transferring a data unit on each segment data lane during a bus read cycle;

means for receiving a valid data unit signal from the host system;

a buffer, having a plurality of memory locations, for storing each data unit;

a data path between the bus interface and the buffer;

a network controller, coupled to the buffer and the network, for transferring data units between the network and the buffer; and a data aligner, in the data path, for controlling alignment of each data unit in the data path in response to the valid data unit signal so that the data units having a fixed width are transferred on a subset of the plurality of segment data lanes to form data units of a selected width and a selected alignment, each segment lane in the subset transferring a data unit, without requiring redundant reads of any transferred data unit in the subset.

33. A method of transferring segments of data between a first data path having N+1 segment lanes D1(n), for n=0 through N, each segment lane D1(n) for transferring a segment of data, and a second data path having N+1 segment lanes D2(n), for n=0 through N, each segment lane D2(n) for transferring a segment of data, comprising step:

generating a control signal at a control resource;

mapping segments of data between the first data path and the second data path in response to the control signal, the first data path having a selected number and a selected alignment of the segments of data to be transferred, and the second data path having a fixed number of the segments of data to be transferred; and transferring at least a segment of data between the first data path and the second data path in response to the control signal.

34. The method of claim 33, further comprising step:

receiving a segment enable signal at the control resource for each segment of data on the segment lanes to indicate a validity state of the corresponding segment of data, the validity state including a valid state to indicate that the segment lane corresponding to the segment enable signal is transferring a valid segment of data, and an invalid state to indicate that the segment lane corresponding to the segment enable signal is transferring one of an invalid segment of data and no segment of data.

35. The method of claim 34, wherein the step of generating the control signal includes:

generating a first control signal; and generating a second control signal.

36. The method of claim 35, wherein the step of mapping includes:

receiving at least a segment of data at a selected first stage input of a first stage, the first stage coupled to the control resource and at least a subset of the segment lanes associated with one of the first and second data paths, supplying the segment of data at a selected first stage output in response to the first control signal, receiving the segment of data at a selected second stage input of a second stage, the second stage coupled to the control resource and at least a subset of the first stage output and the segment lanes coupled to the first stage input, and supplying the segment of data at a selected second stage output in response to the second control signal and coupling the segment of data to the segment lanes not associated with the data path coupled to the first stage input, where a selected one of the first stage and the second stage is capable of queuing and storing segments of data for selectively aligning the segments of data on selected segment lanes of one of the first and second data paths.

37. An apparatus for writing segments of data from a host bus to a buffer, the host bus coupled to a first data path having N+1 segment lanes D1(n), for n=0 through N, each segment lane D1(n) for transferring a segment of data, and the buffer coupled to a second data path having N+1 segment lanes D2(n), for n=0 through N, each segment lane D2(n) for transferring a segment of data, comprising:

a control resource having a control output for generating a first control signal and a second control signal which map segments of data from the first data path to the second data path without redundant accesses of segments of data to be transferred, the second data path having a fixed number of the segments of data to be transferred, and the first data path having a selected number and a selected alignment of the segments of data to be transferred;

a first stage including,
a plurality of first stage inputs, coupled to the control resource and the segment lanes D1(n), for n=0 through N, associated with the first data path, for receiving at least a segment of data at a selected first stage input among the plurality of first stage inputs, and a plurality of first stage outputs for supplying the segment of data at a selected first stage output among the plurality of first stage outputs in response to the first control signal; and a second stage including, a plurality of second stage inputs coupled to the control resource and a subset of the plurality of first stage outputs, for receiving the segment of data at a selected second stage input among the plurality of second stage inputs, a plurality of second stage outputs for supplying the segment of data at a selected second stage output among the plurality of second stage outputs in response to the second control signal and coupling the segment of data to the segment lanes associated with the second data path, the second stage capable of queuing and storing segments of data for selectively aligning the segments of data on selected segment lanes of the second data path, wherein the control resource further includes a control input for receiving a segment enable signal for each segment of data on the segment lanes D1(n) to indicate a validity state of the corresponding segment of data, the validity state including a valid state to indicate that the segment lane D1(n) corresponding to the segment enable signal is transferring a valid segment of data, and an invalid state to indicate that the segment lane D1(n) corresponding to the segment enable signal is transferring one of an invalid segment of data and no segment of data, wherein the first control signal includes a rotate signal and the second control signal includes an output enable signal, wherein the first stage includes:
a shifter for transferring segments of data from the selected first stage input to the selected first stage output, wherein the plurality of first stage inputs includes a plurality of shifter inputs $X1_{in}(j)$, for j=0 through N, corresponding to segment lanes D1(n), for n=0 through N, and the plurality of first stage outputs includes a plurality of shifter outputs $X1_{out}(j)$, for j=0 through N, for transferring segments of data from a selected first stage input $X1_{in}(j)$ to a selected first stage output $X1_{out}(j)$ in response to the rotate signal, wherein the second stage includes:

a plurality of queuing stores having store inputs $R_{in}(k)$, for k=0 through N-1, coupled to the shifter at the plurality of first stage outputs $X1_{out}(j)$, for j=0 through N-1, and store outputs $R_{out}(k)$, for k=0 through N-1, for storing the segment of data from the selected shifter outputs in response to a queue enable signal; and a plurality of selectors having selector inputs $M_{in}(m)$, for m=0 through N-1, coupled to the store outputs $R_{out}(k)$, for k=0 through N-1, and shifter outputs $X1_{out}(j)$, for j=0 through N-1, and selector outputs $M_{out}(m)$, for m=0 through N-1, for supplying a selected segment of data to segment lanes D2(n), for n=0 through N-1, at the second data path in response to the output enable signal, wherein each selector among the plurality of selectors comprises a 2-to-1 multiplexer (MUX), including:
a first MUX input coupled to a corresponding store output,
a second MUX input coupled to a corresponding shifter output,
a MUX control input for receiving the output enable signal and selecting one of the first MUX input and the second MUX input, and
a MUX output for transferring the selected segment of data on one of the first MUX input and the second MUX input in response to the output enable signal at the MUX control input, and wherein the control resource generates the rotate signal by determining a data offset value and a current queue value, the data offset value determined by counting the segment lanes D1(n) not transferring segments of data and the current queue value determined by counting the queuing stores storing segments of data, the rotate value equals the current queue value minus the data offset value.

38. The apparatus of claim 37, wherein the control resource determines the data offset value by counting the number of segment enable signals in the invalid state from a lowest segment lane D1(n), for n=0, to a higher segment lane D1(n), for n=1 through N, until the segment lane D1(n) corresponding to the segment enable signal in the valid state is reached.

39. The apparatus of claim 37, wherein the output enable signal includes:
a bypass enable signal for bypassing at least one of the plurality of queuing stores, where the control resource generates the bypass enable signal to select the second MUX input corresponding to the shifter outputs $X1_{out}(j)$, for j=0 through N-1, and
a nonbypass enable signal for not bypassing the plurality of queuing stores, where the control resource generates the nonbypass enable signal to select the first MUX input corresponding to the store output.

40. The apparatus of claim 39, wherein the control resource generates the bypass enable signal when a sum of the current queue value and the number of segment enable signals corresponding to segment lanes D1(n) transferring segments of data equals the fixed number of the segments of data on the second data path.

41. The apparatus of claim 40, wherein a desired number of the fixed number of segments of data is N+1.

42. The apparatus of claim 39, wherein the control resource generates the nonbypass enable signal when a sum of the current queue value and the number of segment enable signals corresponding to segment lanes D1(n) transferring segments of data is one of less than N+1 and greater than N+1.

43. An apparatus for reading segments of data from a buffer to a host bus, the host bus coupled to a first data path having N+1 segment lanes D1(n), for n=0 through N, each segment lane D1(n) for transferring a segment of data, and the buffer coupled to a second data path having N+1 segment lanes D2(n), for n=0 through N, each segment lane D2(n) for transferring a segment of data, comprising:

a control resource having a control output for generating a first control signal and a second control signal which map segments of data from the second data path to the first data path without redundant accesses of segments of data to be transferred, the first data path having a selected number and a selected alignment of the segments of data to be transferred, and the second data path having a fixed number of the segments of data to be transferred;

a first stage including
a plurality of first stage inputs, coupled to the control resource and a subset of the segment lanes D2(n), for n=1 through N, associated with the second data path, for receiving at least a segment of data at a selected first stage input among the plurality of first stage inputs, and
a plurality of first stage outputs for supplying the segment of data at a selected first stage output among the plurality of first stage outputs in response to the first control signal; and a second stage including,
a plurality of second stage inputs coupled to the control resource and at least a subset of the plurality of first stage outputs and the segment lanes coupled to the plurality of first stage inputs, for receiving the segment of data at a selected second stage input among the plurality of second stage inputs, and a plurality of second stage outputs for supplying the segment of data at a selected second stage output among the plurality of second stage outputs in response to the second control signal and coupling the segment of data to the segment lanes associated with the first data path where the first stage is capable of queuing and storing segments of data for selectively aligning the segments of data on selected segment lanes of the first data path, wherein the control resource further includes a control input for receiving a segment enable signal for each segment of data on the segment lanes $D2(n)$ to indicate a validity state of the corresponding segment of data, the validity state including a valid state to indicate that the segment lane $D2(n)$ corresponding to the segment enable signal is transferring a valid segment of data, and an invalid state to indicate that the segment lane $D2(n)$ corresponding to the segment enable signal is transferring one of an invalid segment of data and no segment of data, wherein the first data path is coupled to a host bus, the second data path is coupled to a buffer, the plurality of first stage inputs is coupled to the second data path, and the plurality of first stage outputs is coupled to the first data path, wherein the first control signal includes a selector enable signal and the second control signal includes a rotate signal, wherein the first stage includes:

a plurality of queuing stores having store inputs $R_{in}(k)$, for $k=1$ through $N$, coupled to the subset of the segment lanes $D2(n)$, for $n=1$ through $N$, and store outputs $R_{out}(k)$, for $k=1$ through $N$, for storing the segment of data from the subset of the segment lanes $D2(n)$, for $n=1$ through $N$, in response to a queue enable signal; and a plurality of selectors having selector inputs $M_{in}(m)$, for $m=1$ through $N$, coupled to the store outputs $R_{out}(k)$, for $k=1$ through $N$, and the subset of the segment lanes $D2(n)$, for $n=1$ through $N$, and selector outputs $M_{out}(m)$, for $m=1$ through $N$, for supplying a selected segment of data to the selector outputs in response to the selector enable signal, wherein the second stage includes:

a shifter for transferring segments of data from the selected second stage input to the selected second stage output, wherein the plurality of second stage inputs includes a plurality of shifter inputs $X2_{in}(j)$, for $j=0$ through $N$, coupled to the segment lanes $D2(n)$, for $n=0$, and the plurality of selectors at the selector outputs $M_{out}(m)$, for $m=1$ through $N$, and the plurality of second stage outputs includes a plurality of shifter outputs $X2_{out}(j)$, for $j=0$ through $N$, for transferring segments of data from a selected second stage input $X2_{in}(j)$ to a selected second stage output $X2_{out}(j)$ in response to the rotate signal, wherein the selected second stage output $X2_{out}(j)$ corresponds to the segment lane $D1(n)$ with the lowest n that is enabled for receiving the segment of data, and wherein the control resource generates the rotate signal by determining a data offset value and a read count value, the data offset value determined by counting the segment lanes $D2(n)$ not transferring segments of data and the read count value determined by counting the segment lanes $D2(n)$ transferring segments of data the rotate value equals the data offset value minus the read count value.

44. The apparatus of claim 43, wherein the control resource determines the data offset value by counting the number of segment enable signals in the invalid state from a lowest segment lane $D2(n)$, for $n=0$, to a higher segment lane $D2(n)$, for $n=1$ through $N$, until the segment lane $D2(n)$ corresponding to the segment enable signal in the valid state is reached.

45. The apparatus of claim 43, wherein the control resource determines the read count value by counting the number of segment enable signals in the valid state.

46. The apparatus of claim 43, wherein the selector enable signal includes:

a bypass enable signal for bypassing at least one of the plurality of queuing stores, where the control resource generates the bypass enable signal to select the second MUX input corresponding to the subset of segment lanes $D2(n)$, for $n=1$ through $N$, and a nonbypass enable signal for not bypassing the plurality of queuing stores, where the control resource generates the nonbypass enable signal to select the first MUX input corresponding to the store output.

47. The apparatus of claim 46, wherein the control resource generates the bypass enable signal when a sum of the segments of data in the queuing stores and the segments of data in the segment lanes $D2(n)$, for $n=0$ through $N$, equals a desired number of the segments of data.

48. The apparatus of claim 46, wherein the control resource generates the bypass enable signal when all segments of data necessary to satisfy a desired number of the segments of data for the transfer are located on the segment lanes $D2(n)$, for $n=0$ through $N$, in the first data path.

49. The apparatus of claim 46, wherein the control resource generates the bypass enable signal when the queuing stores contain no segment of data and all segments of data necessary to satisfy a desired number of the segments of data for the transfer are located on the segment lanes $D2(n)$, for $n=0$ through $N$.

50. The apparatus of claim 46, wherein the control resource generates the nonbypass enable signal when a sum of the segments of data stored in the queuing stores and the read count value is less than the number of segments of data necessary to satisfy a desired number of the segments of data for the transfer.

51. The apparatus of claim 46, wherein the control resource generates the nonbypass enable signal when a sum of the segments of data stored in the queuing stores and the new count value is greater than the number of segments of data necessary to satisfy a desired number of the segments of data for the transfer.

* * * * *